(12) United States Patent
Higeta et al.

(10) Patent No.: US 10,150,871 B2
(45) Date of Patent: Dec. 11, 2018

(54) AZO COMPOUND, DYE-BASED POLARIZING FILM CONTAINING SAME, AND POLARIZING PLATE

(71) Applicants: Nippon Kayaku Kabushiki Kaisha, Tokyo (JP); Polatechno Co., Ltd., Niigata (JP)

(72) Inventors: Takahiro Higeta, Tokyo (JP); Takuto Nishiguchi, Tokyo (JP); Mitsunori Nakamura, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 0 days.

(21) Appl. No.: 15/129,236

(22) PCT Filed: Mar. 27, 2015

(86) PCT No.: PCT/JP2015/059552
§ 371 (c)(1),
(2) Date: Sep. 26, 2016

(87) PCT Pub. No.: WO2015/152026
PCT Pub. Date: Oct. 8, 2015

(65) Prior Publication Data
US 2017/0210902 A1    Jul. 27, 2017

(30) Foreign Application Priority Data

Mar. 31, 2014 (JP) ................. 2014-074834
Mar. 31, 2014 (JP) ................. 2014-074835
Mar. 31, 2014 (JP) ................. 2014-074836

(51) Int. Cl.
| | | |
|---|---|---|
| G02B 5/30 | (2006.01) | |
| C09B 31/30 | (2006.01) | |
| G02F 1/1335 | (2006.01) | |
| C09B 31/08 | (2006.01) | |
| C09B 31/20 | (2006.01) | |
| C09B 31/22 | (2006.01) | |
| G02B 1/04 | (2006.01) | |

(52) U.S. Cl.
CPC .............. *C09B 31/30* (2013.01); *C09B 31/08* (2013.01); *C09B 31/20* (2013.01); *C09B 31/22* (2013.01); *G02B 1/04* (2013.01); *G02B 5/30* (2013.01); *G02B 5/3025* (2013.01); *G02F 1/133528* (2013.01); *Y10T 428/1041* (2015.01)

(58) Field of Classification Search
CPC .......... G02B 1/04; G02B 5/3025; G02B 5/30; G02F 1/133528; C09B 31/20; C09B 31/22; C09B 31/30; C09B 31/08; Y10T 428/1041

USPC ....................................................... 428/1.31
See application file for complete search history.

(56) References Cited

U.S. PATENT DOCUMENTS

| | | |
|---|---|---|
| 6,399,752 B1 | 6/2002 | Ohta et al. |
| 2005/0003109 A1 | 1/2005 | Oiso et al. |
| 2011/0164208 A1 | 7/2011 | Nishiguchi et al. |
| 2013/0302538 A1 | 11/2013 | Higeta et al. |
| 2013/0314786 A1 * | 11/2013 | Higeta ..................... G02B 1/04 359/487.02 |

FOREIGN PATENT DOCUMENTS

| | | | |
|---|---|---|---|
| EP | 2674460 A1 | 12/2013 | |
| JP | 2622748 B2 | 6/1997 | |
| JP | 9-302250 A | 11/1997 | |
| JP | 2001-33627 A | 2/2001 | |
| JP | 2002-275381 A | 9/2002 | |
| JP | 2003-64276 A | 3/2003 | |
| JP | 2003-327858 A | 11/2003 | |
| JP | 2005-255846 A | 9/2005 | |
| JP | WO 2012108173 A1 * | 8/2012 | ............... G02B 1/04 |
| JP | 5366947 B2 | 12/2013 | |
| WO | 2009/154055 A1 | 12/2009 | |
| WO | 2012/108173 A1 | 8/2012 | |

OTHER PUBLICATIONS

European communication dated Aug. 4, 2017 in corresponding European patent application No. 15772361.0.
Hosoda et al., Senryo Kagaku (Dye Chemistry) 3rd edition, Oct. 1963, pp. 135-234.

* cited by examiner

*Primary Examiner* — Sophie Hon
(74) *Attorney, Agent, or Firm* — Nields, Lemack & Frame, LLC

(57) ABSTRACT

The present invention relates to an azo compound that is useful as a dichroic pigment used in a polarizing plate having excellent polarizing performance and durability and having little color leakage in a visible light region, and used in a neutral gray polarizing plate for vehicle mounting that uses the aforementioned polarizing plate. More specifically, the invention relates to an azo compound that is represented by formula (1) [In the formula, $R_1$-$R_4$ each independently represent a hydrogen atom, a C1-5 alkyl group, a C1-5 alkoxy group, a sulfo group, or a C1-5 alkoxy group having a sulfo group, X represents an amino group having a substituent, a benzoylamino group having a substituent, a phenylamino group having a substituent, a phenylazo group having a substituent, or a naphthotriazole group having a substituent, m represents 3 or 4, n represents 1 or 2, and p represents 1, 2, or 3.], or to a salt of said compound.

10 Claims, No Drawings

AZO COMPOUND, DYE-BASED POLARIZING FILM CONTAINING SAME, AND POLARIZING PLATE

TECHNICAL FIELD

The present invention relates to a novel azo compound, and a dye polarizing film and a polarizing plate containing such an azo compound.

BACKGROUND ART

A polarizing plate having a function of transmitting/shielding light is a basic constitutional element of a display device such as a liquid crystal display (LCD) together with a liquid crystal having a function of switching light. The application of LCD has been diversified from the earliest field of small devices such as calculators and clocks into laptop computers, word processors, liquid crystal projectors, liquid crystal TVs, car navigations and indoor/outdoor measurement instruments. Also application thereof to lenses having a polarization function and application thereof to sunglasses improved in visibility can be made. Recently, application to e.g., polarized glasses for use in compatible 3D TVs has been made. Since polarizing plates are used in a wide variety of fields as mentioned above, use condition thereof is diversified from low temperature to high temperature, low humidity to high humidity and low light intensity to high light intensity. For the reason, development of polarizing plates having high polarization performance and excellent durability has been desired.

At present, a polarizing film is manufactured by staining a polarizing-film base such as a stretched and oriented film formed of a polyvinyl alcohol or a derivative thereof or a polyene film (which is prepared (by producing a polyene) through dehydrochlorination of a polyvinyl chloride film or through dehydration of a polyvinyl alcohol film, and giving orientation thereto) with an iodine or a dichroic dye serving as a polarizing element or by adding an iodine or a dichroic dye to the film. Of these polarizing films, an iodine polarizing film (using an iodine as a polarizing element) is excellent in polarization performance but weak to water and heat. Thus, the iodine polarizing film has a problem in durability when the film is used for a long period of time in high temperature and high humidity conditions. To improve durability, various methods have been considered such as a method of treating the film with formalin or an aqueous solution containing boric acid and a method of applying a polymer film having low moisture permeability as a protecting film; however, these methods do not produce sufficient effects. In contrast, the dye polarizing film using a dichroic dye as the polarizing element has excellent moisture resistance and heat resistance compared to the iodine polarizing film but, in general, it fails to have sufficient polarization performance.

To a polymer film, several dichroic dyes are allowed to adsorb and orientation is given to prepare a neutral-color polarizing film. When two neutral-color polarizing films are stacked such that the individual orientation directions intersect at right angles (orthogonal arrangement) and then attached to a liquid crystal panel, if light leakage (color leakage) occurs in a specific wavelength within the visible light wavelength region, the color phase of the liquid crystal display sometimes changes in a dark state. Then, in order to prevent discoloration of a liquid crystal display due to color leakage in a specific wavelength in a dark state when the polarizing film is attached to a liquid crystal display device, in the neutral color polarizing film (which is prepared by allowing a polymer film to adsorb several dichroic dyes and giving orientation), it is necessary to uniformly decrease the transmittance of light in the orthogonal arrangement (orthogonal transmittance) within a visible light wavelength region.

Until recent years, to improve clearness of images in liquid crystal displays, images having a high brightness have been displayed. In hybrid cars and mobile terminals having such displays integrated therein, extension of a battery life has been desired. To satisfy the desire, reduction of power consumption is considered by liquid crystal display makers. In the circumstances, development of a neutral gray polarizing plate having good polarization performance and capable of increasing clearness of an image even in a lower brightness level has been desired. In the meantime, in in-car liquid crystal displays, since they are used in high-temperature and high humidity environments during summer (in car), development of a polarizing plate whose degree of polarization will not vary is desired. In past days, iodine polarizing plates having good polarization performance and displaying neutral gray were used. However, the iodine polarizing plates, as mentioned above, have a problem in that light resistance, heat resistance and moisture/heat resistance are insufficient due to use of iodine as a polarizer. To overcome this problem, a neutral gray polarizing plate using a dichromatic dye as a polarizer has come to be used; however, the neutral gray polarizing plate usually employs pigments of the three primary colors in combination, for uniformly improving transmittance and polarization performance in the whole visible light wavelength region. Then, dichroism pigments having satisfactory polarization performance had to be developed individually for three primary colors.

However, the bright line of a light source for a liquid crystal display varies depending upon the maker. Then, in developing a dichroism pigment having satisfactory polarization performance, it is important to design the wavelength of a pigment especially in accordance with the wavelength of the bright line. Because of this, development of three primary colors having excellent polarization performance in a limited wavelength region must be required.

As the dyes to be used in manufacturing the dye polarizing film, for example, water-soluble azo compounds described in Patent Literature 1 to Patent Literature 5 are mentioned.

CITATION LIST

Patent Literatures

Patent Literature 1: Japanese Patent No. 2622748
Patent Literature 2: JP 2001-33627 A
Patent Literature 3: Japanese Patent No. 5366947
Patent Literature 4: JP 2003-327858 A
Patent Literature 5: JP 2005-255846 A

Non Patent Literature

Non Patent Literature 1: Dye Chemistry; written by Yutaka Hosoda

SUMMARY OF INVENTION

Technical Problem

An object of the present invention is to provide a high-performance polarizing plate having excellent polarization performance, moisture resistance, heat resistance and light resistance. Another object of the present invention is to provide a neutral color polarizing plate, which is prepared by allowing a polymer film to adsorb at least two types of dichroic dyes and giving orientation, which has no color leakage in the visible light wavelength region in the orthogonal arrangement and which is a high-performance polarizing plate having excellent polarization performance, moisture resistance, heat resistance and light resistance. A further object of the invention is to provide a neutral gray polarizing plate for an in-car liquid crystal display having excellent performance, more specifically, having satisfactory brightness, polarization performance, durability and light resistance.

Solution to Problem

The present inventors conducted studies with a view to attaining these objects. As a result, they found that a polarizing film and a polarizing plate containing a predetermined azo compound and a salt thereof has excellent polarization performance, moisture resistance, heat resistance and light resistance, and accomplished the present invention.

More specifically, the present invention relates to
(1) An azo compound represented by
the following formula (1):

[Formula 1]

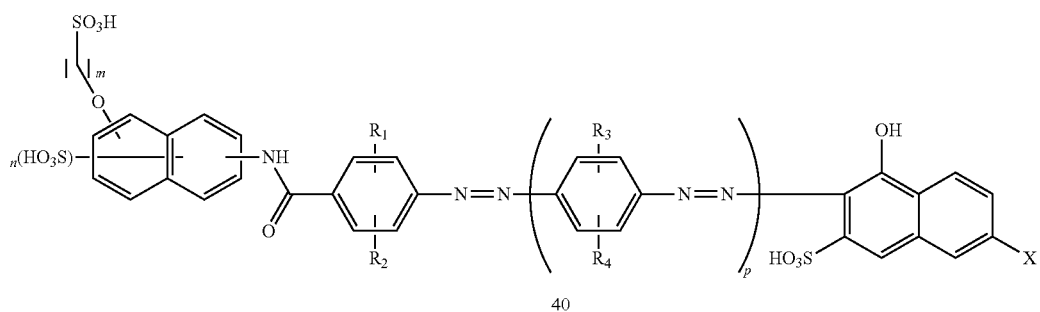

(1)

wherein $R_1$ to $R_4$ each independently represent a hydrogen atom, an alkyl group having 1 to 5 carbon atoms, an alkoxy group having 1 to 5 carbon atoms, a sulfo group or an alkoxy group having 1 to 5 carbon atoms and a sulfo group; X represents an amino group having a substituent, a benzoylamino group having a substituent, a phenylamino group having a substituent, a phenylazo group having a substituent or a naphthotriazole group having a substituent; m represents 3 or 4; n represents 1 or 2; and p represents 1, 2 or 3, or a salt thereof;

(2) The azo compound according to (1), in which X is a phenylamino group represented by the following formula (2):

[Formula 2]

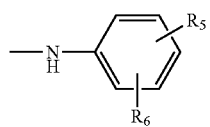

(2)

wherein $R_5$ and $R_6$ each independently represent a hydrogen atom, a methyl group, a methoxy group, a sulfo group, an amino group or a substituted amino group,
or a salt thereof;

(3) The azo compound according to (1), in which X is a benzoylamino group represented by the following formula (3):

[Formula 3]

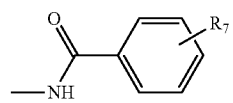

(3)

wherein $R_9$ represents a hydrogen atom, a hydroxy group, an amino group or a substituted amino group,
or a salt thereof;

(4) The azo compound according to (1), in which X is a naphthotriazole group represented by the following formula (4):

[Formula 4]

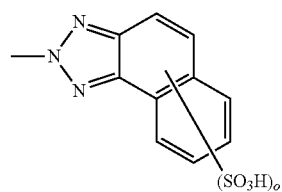

(4)

wherein o represents 1 or 2,
or a salt thereof;

(5) The azo compound according to (1), in which X is a phenylazo group represented by the following formula (5):

[Formula 5]

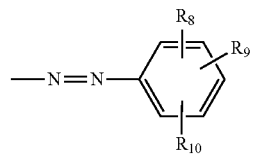

(5)

wherein $R_8$ to $R_{10}$ each independently represent a hydrogen atom, a hydroxy group, an alkyl group having 1 to 5 carbon atoms, an alkoxy group having 1 to 5 carbon atoms, an amino group or a substituted amino group, or a salt thereof;
(6) The azo compound according to any one of (1) to (5), in which $R_1$ and $R_2$ are hydrogen atoms, or a salt thereof;
(7) The azo compound according to any one of (1) to (6), in which $R_3$ and $R_4$ each independently represent a hydrogen atom, a methyl group, a methoxy group or an alkoxy group having 1 to 5 carbon atoms and a sulfo group, or a salt thereof;
(8) The azo compound according to (1), represented by the following formula (6):

[Formula 6]

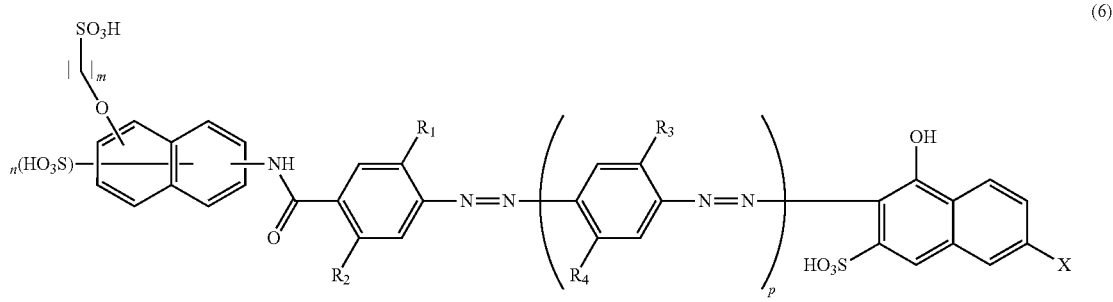

(6)

wherein $R_1$ to $R_4$, X, m, n and p are the same as defined in formula (1),
or a salt thereof;
(9) A dye polarizing film containing a polarizing-film base containing the azo compound according to any one of (1) to (8) or a salt thereof;
(10) A dye polarizing film containing a polarizing-film base containing the azo compound according to any one of (1) to (8) or a salt thereof and at least one other organic dye;
(11) A dye polarizing film containing a polarizing-film base containing at least two types of azo compounds according to any one of (1) to (8) or salts thereof and at least one other organic dye;
(12) The dye polarizing film according to any one of (9) to (11), in which the polarizing-film base is a film formed of a polyvinyl alcohol resin or a derivative thereof;
(13) A dye polarizing plate obtained by attaching a transparent protecting layer onto at least one surface of the dye polarizing film according to any one of (9) to (12);
(14) A polarizing plate for a liquid crystal display using the dye polarizing film or dye polarizing plate according to any one of (9) to (13);
(15) An in-car neutral gray polarizing plate using the dye polarizing film or dye polarizing plate according to any one of (9) to (13); and
(16) A liquid crystal display device using the dye polarizing plate according to any one of (13) to (15).

Advantageous Effects of Invention

The azo compound of the present invention or a salt thereof is useful as a dye for a polarizing film. The polarizing film containing such a compound has not only high polarization performance comparable to a polarizing film using iodine but also excellent durability. Because of this, the polarizing film is suitably used in various types of liquid crystal display devices and liquid-crystal projectors, in cars requiring high polarization performance and durability, and in displays for industrial instruments used in various environments.

DESCRIPTION OF EMBODIMENTS

The azo compound of the present invention is represented by the above formula (1). In the above formula (1), $R_1$ to $R_4$ each independently represent a hydrogen atom, an alkyl group having 1 to 5 carbon atoms, an alkoxy group having 1 to 5 carbon atoms, a sulfo group or an alkoxy group having 1 to 5 carbon atoms and a sulfo group; X represents an amino group having a substituent, a benzoylamino group having a substituent, a phenylamino group having a substituent, a phenylazo group having a substituent or a naphthotriazole group having a substituent; m represents 3 or 4; n represents 1 or 2 and p represents 1, 2 or 3.

Now, the compound of formula (1) will be described. In the following description on substituents, "lower" means the number of carbon atom is 1 to 5.

Also in the following description, hydrogen atoms are included in the substituents, but will be collectively described as substituents for convenient sake.

In the following formula (7), which is a part of the structure represented by the above formula (1), m represents 3 or 4, n represents an integer of 1 or 2. Reference symbol m is preferably 3 and n is preferably 1. In particular, the case where m is 3 and n is 1 is preferable. The substitution position with a lower alkoxy group having a sulfo group is preferably either the 2-position or 4-position and particularly preferably the 4-position. The substitution position with a sulfo group is more preferably any one or two of the 2-, 4- and 7-positions, further preferably the 2-position, 4-position and 2,7-positions, and particularly preferably the 2-position. The substitution position of the benzoylamino group in the following formula (7) for the naphthyl group in the following formula (7) is preferably the 6- or 7-position and particularly preferably the 6-position. The substituents $R_1$ and $R_2$ in the benzoylamino group of the following formula (7) each independently represent a hydrogen atom, a lower alkyl group, a lower alkoxy group, a sulfo group or a lower alkoxy group having a sulfo group; more preferably, a hydrogen atom, a methyl group, an ethyl group, a methoxy group, an ethoxy group, or a sulfo group. More preferable lower alkoxy group having a sulfo group is a straight-chain alkoxy group and more preferable substitution position with a sulfo group is a terminal of the alkoxy group. Further preferred is 3-sulfopropoxy group or 4-sulfobutoxy group. Particularly preferred is a hydrogen atom, a methyl group, a methoxy group or a 3-sulfopropoxy group. The substitution positions are preferably the 2-position alone, the 5-position alone, a combination of the 2-position and the 6-position, a combination of the 2-position and the 5-position and a combination of the 3-position and the 5-position, and particularly preferably, the 2-position alone, the 5-position alone and a combination of the 2-position and the 5-position as shown in the following formula (7). Note that, the 2-position alone and the 5-position alone mean that a single substituent other than a hydrogen atom is present at the 2-position and the 5-position, respectively.

[Formula 7]

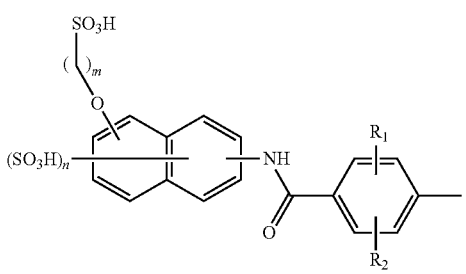

(7)

wherein $R_1$, $R_2$, m and n are the same as defined in the formula (1).

X represents a benzoylamino group having a substituent, a phenylamino having a substituent, a phenylazo group having a substituent or a naphthotriazole group having a substituent. In the case where X represents a benzoylamino group having a substituent, a phenylamino group having a substituent or a phenylazo group having a substituent, the substituent is preferably a hydrogen atom, a lower alkyl group, a lower alkoxy group, a hydroxy group, a carboxy group, a sulfo group, an amino group or a substituted amino group; and in the case where it represents a naphthotriazole group having a substituent, the substituent is preferably a sulfo group.

In the formula (1), X preferably represents any one of structures represented by the following formulas (2) to (5).

[Formula 8]

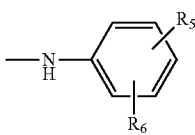

(2)

wherein $R_5$ and $R_6$ each independently represent a hydrogen atom, a methyl group, a methoxy group, a sulfo group, an amino group or a substituted amino group.

[Formula 9]

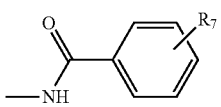

(3)

wherein $R_7$ represents a hydrogen atom, a hydroxy group, an amino group or a substituted amino group.

[Formula 10]

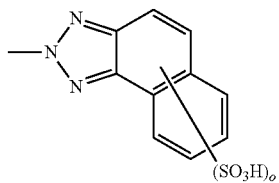

(4)

wherein o represents 1 or 2.

[Formula 11]

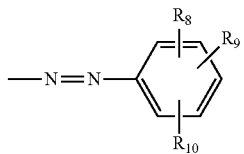

(5)

wherein $R_8$ to $R_{10}$ each independently represent a hydrogen atom, a hydroxy group, an alkyl group having 1 to 5 carbon atoms, an alkoxy group having 1 to 5 carbon atoms, an amino group or a substituted amino group.

In the case where X is a phenylamino group having a substituent, the substituent is preferably a hydrogen atom, a methyl group, a methoxy group, an amino group, a substituted amino group or a sulfo group. The substitution position is not particularly limited; however, at least one substituent is preferably present at the p-position relative to the amino group.

In the case where X is a benzoylamino group having a substituent, the substituent is preferably a hydrogen atom, an amino group, a substituted amino group or a hydroxy group, and particularly preferably a hydrogen atom or an amino group. The substitution position, which is not particularly limited, is preferably the p-position.

In the case where X is a phenylazo group having a substituent, the substituent is preferably a hydroxy group, an amino group, a substituted amino group, a methyl group, a methoxy group, a carboxy group or carboxy, and particularly preferably, a hydroxy group.

$R_3$ and $R_4$ each independently represent a hydrogen atom, a lower alkyl group, a lower alkoxy group, a sulfo group or a lower alkoxy group having a sulfo group, and preferably, a hydrogen atom, a methyl group, an ethyl group, a methoxy group, an ethoxy group, a sulfo group or a lower alkoxy group having a sulfo group (which is a straight-chain alkoxy group and the substitution position with a sulfo group is an end of the alkoxy group, 3-sulfopropoxy group or 4-sulfobutoxy group is further preferable); and particularly preferably, a hydrogen atom, a methyl group, a methoxy group or a 3-sulfopropoxy group. In the case where p is 2 or 3, individual $R_3$ and individual $R_4$ are independently selected. The substitution positions are preferably the 2-position alone, the 5-position alone, a combination of the 2-position and the 6-position, a combination of the 2-position and the 5-position and a combination of the 3-position and the 5-position; and particularly preferably, the 2-position alone, the 5-position alone and a combination of the 2-position and the 5-position as shown in the following formula (6). Note that, the 2-position alone and the 5-position alone mean that a single substituent other than a hydrogen atom is present at the 2-position and the 5-position, respectively.

[Formula 12]
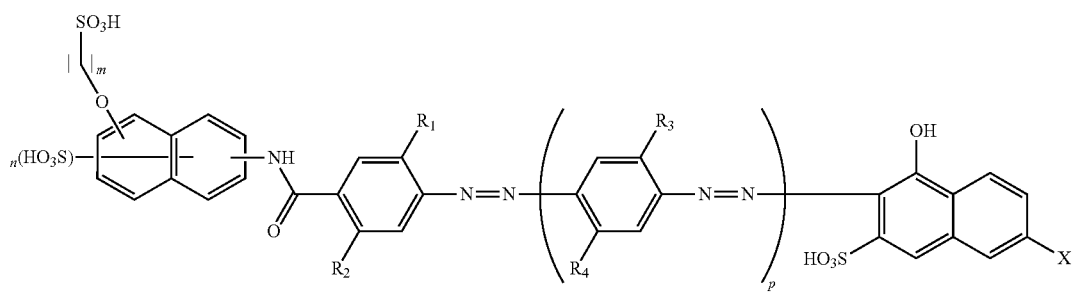
(6)
wherein m, n, p, $R_1$ to $R_4$ and X are the same as defined in the formula (1).
Next, examples of the azo compound represented by the above formula (1) to be used in the present invention will be described. Note that in the formula, a sulfo group, a carboxy group and a hydroxy group are shown in the form of free acid.
[Formula 13]
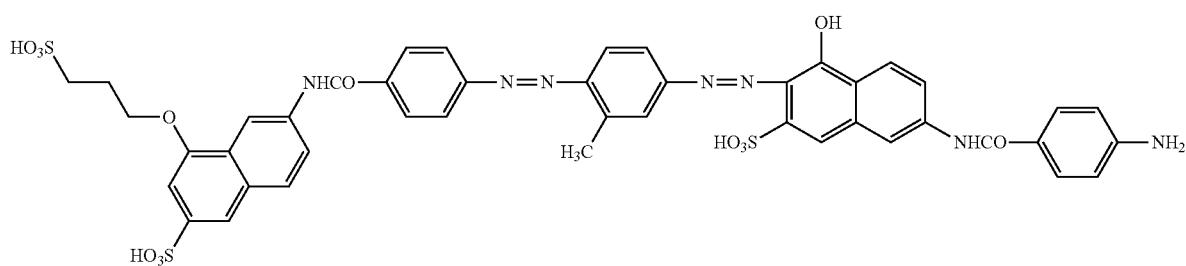
(8)
[Formula 14]
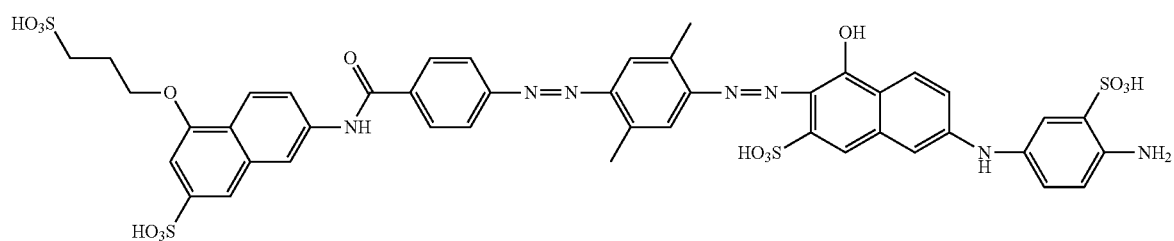
(9)
[Formula 15]
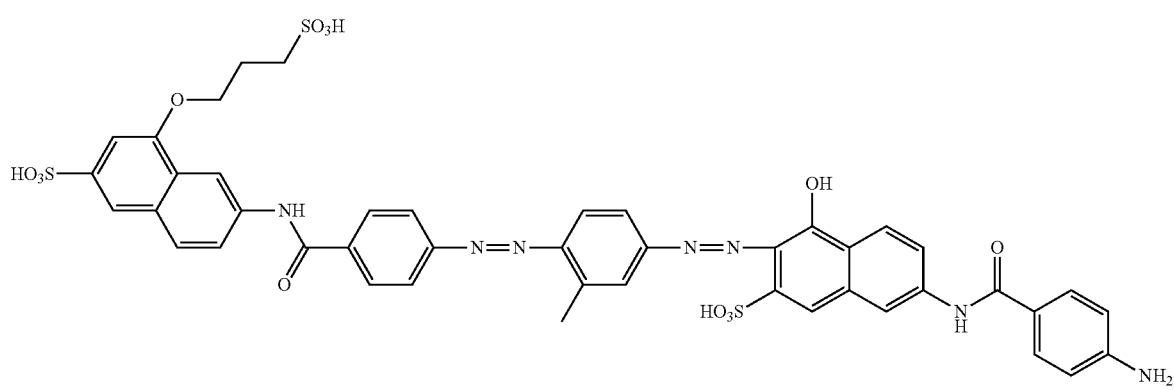
(10)

-continued
[Formula 16]
(11)
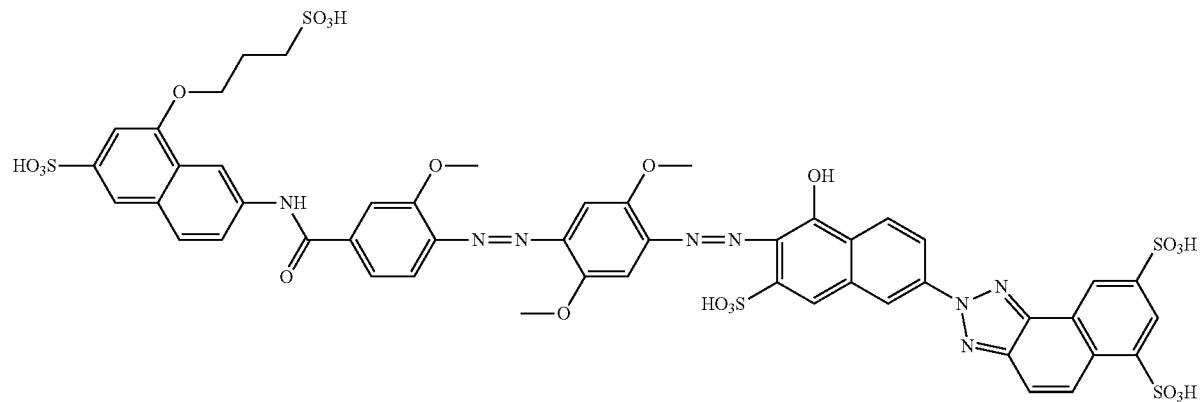
[Formula 17]
(12)
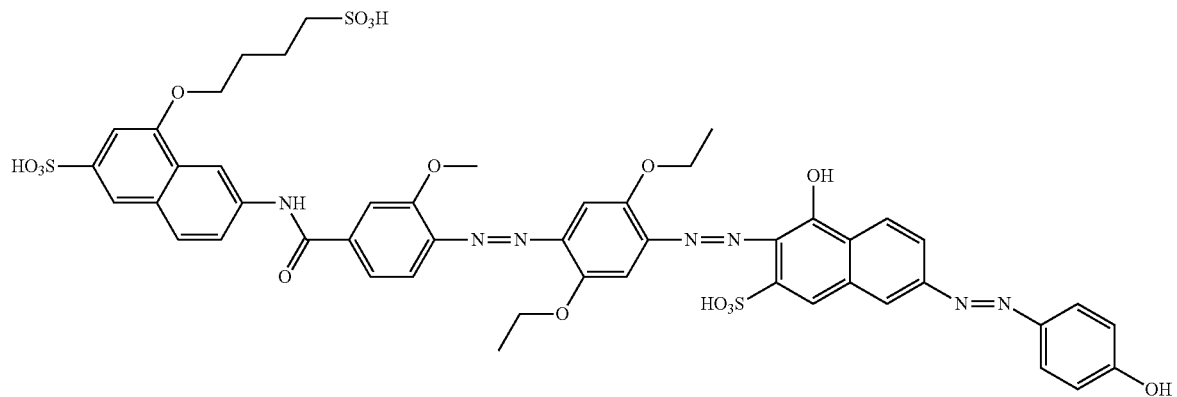
[Formula 18]
(13)
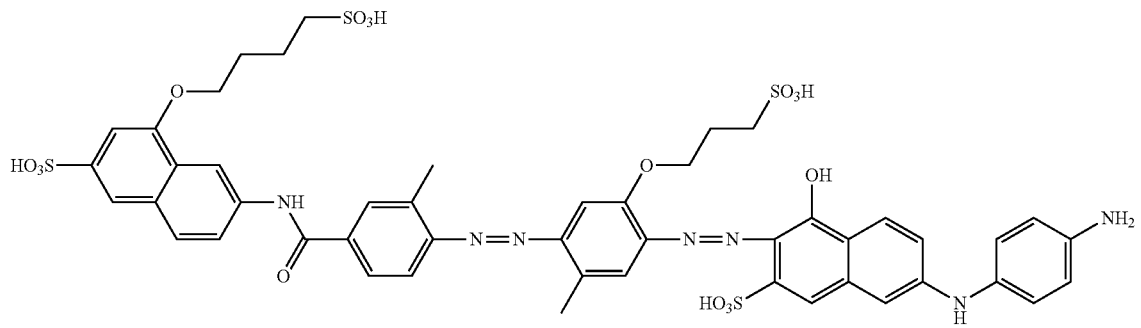

-continued
[Formula 19]
(14)
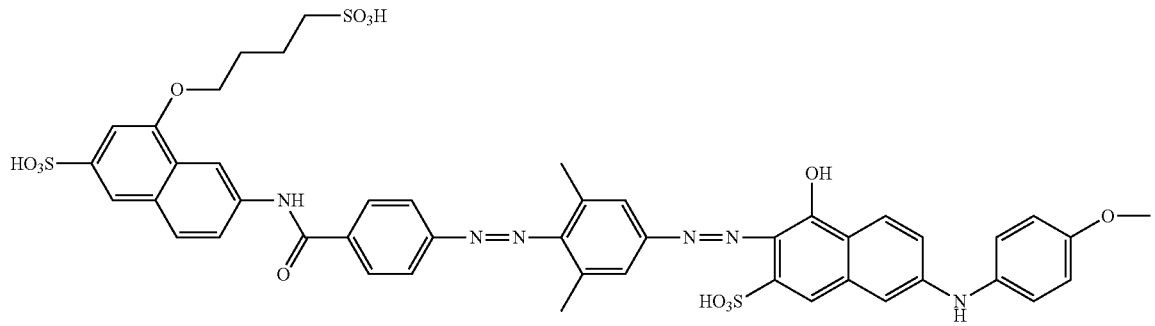
[Formula 20]
(15)
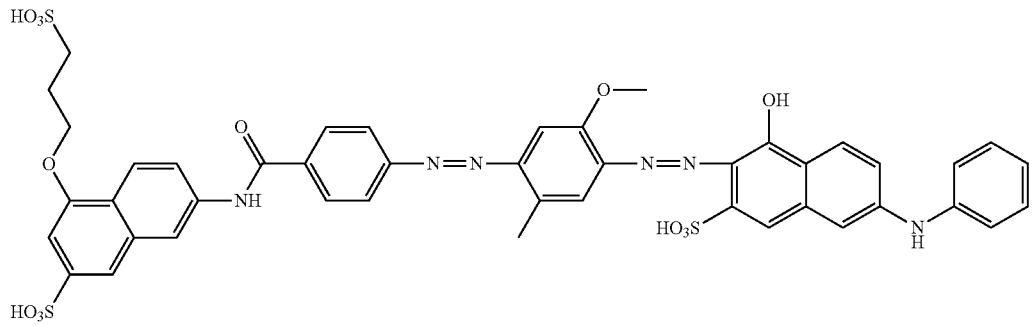
[Formula 21]
(16)
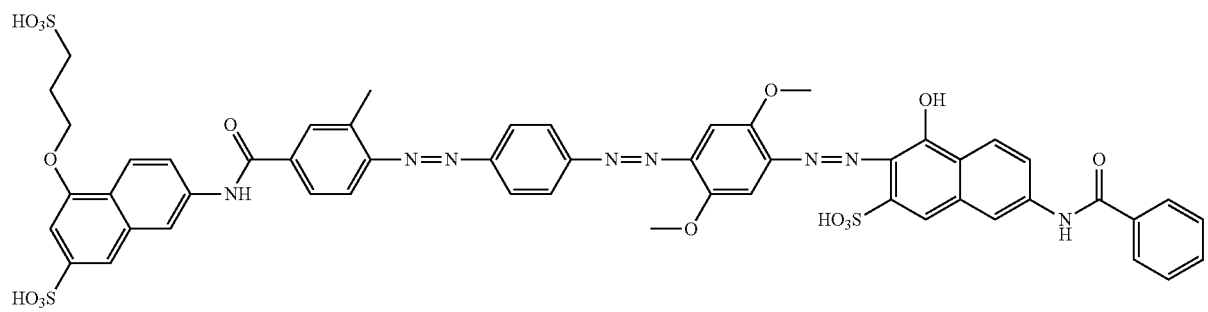
[Formula 22]
(17)
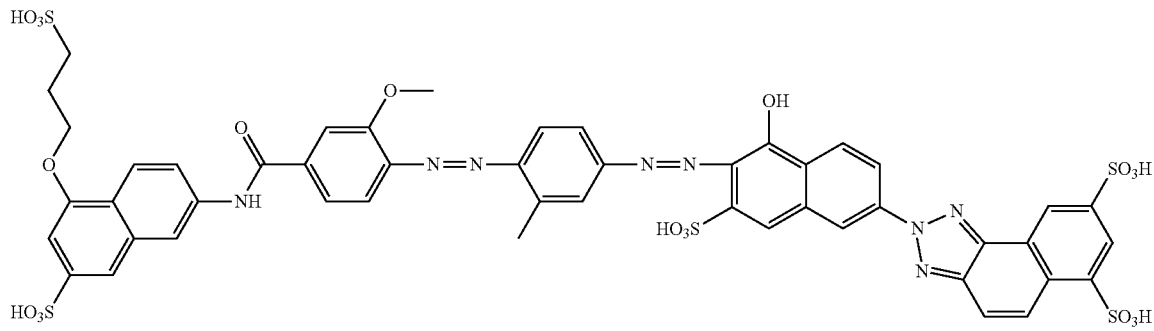

-continued
[Formula 23]
(18)
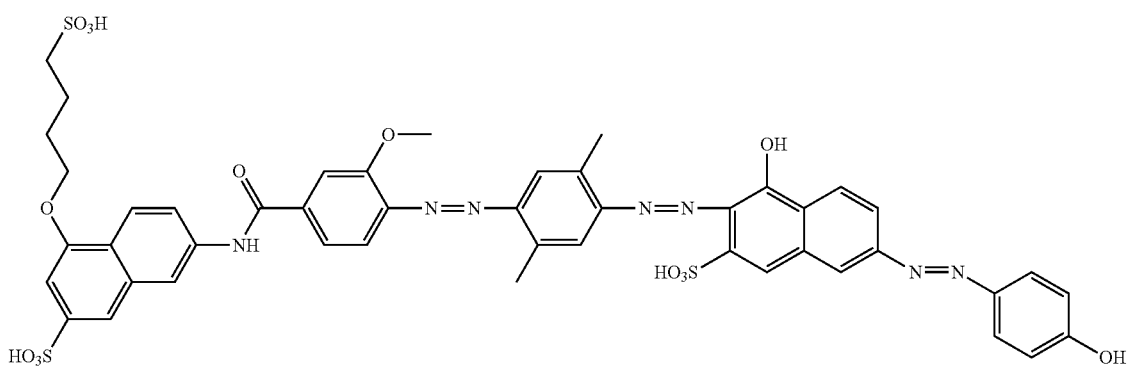
[Formula 24]
(19)
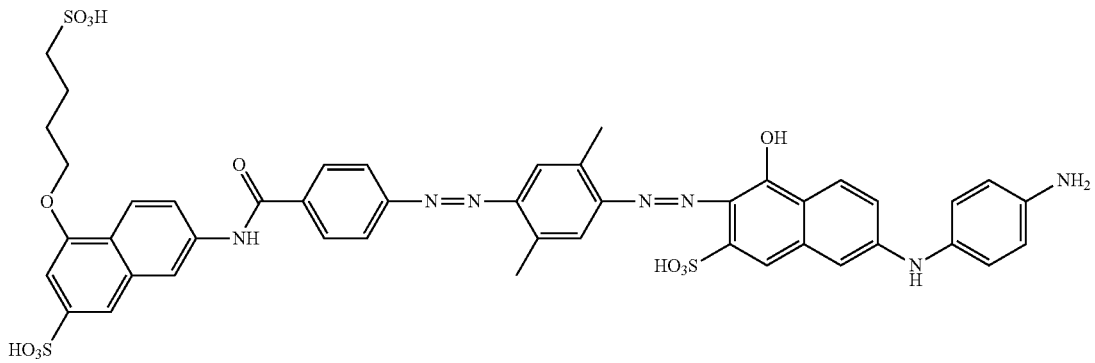
[Formula 25]
(20)
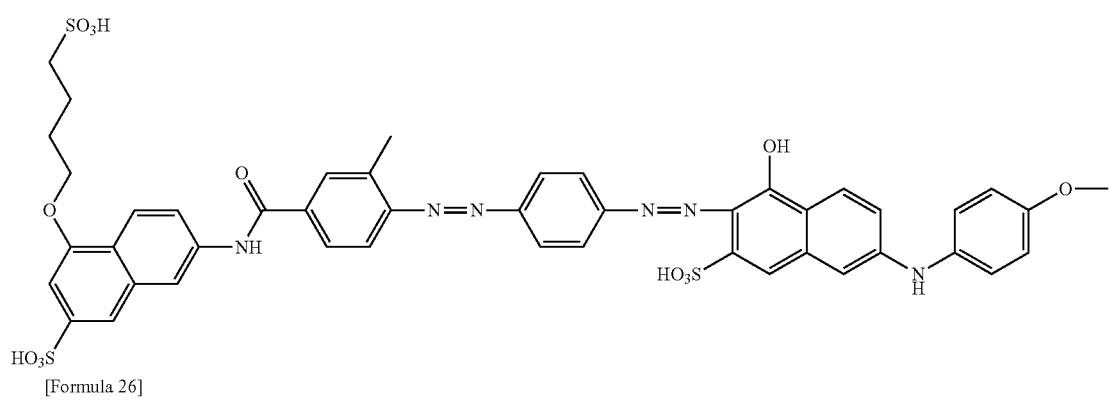
[Formula 26]
(21)
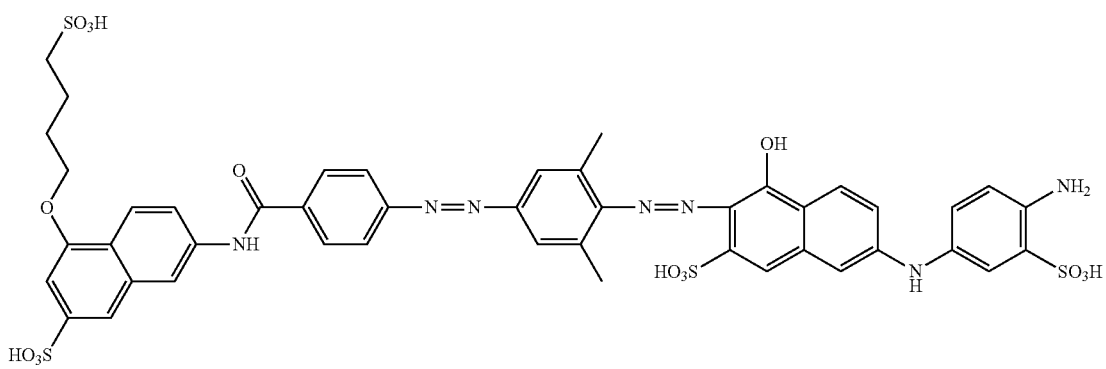

-continued
[Formula 27]
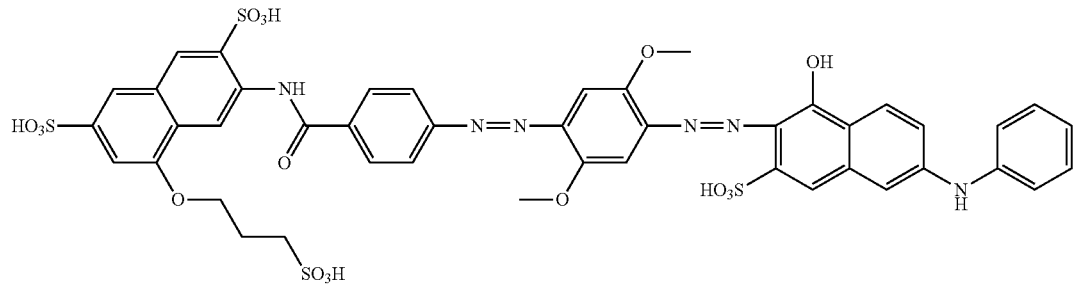
(22)
[Formula 28]
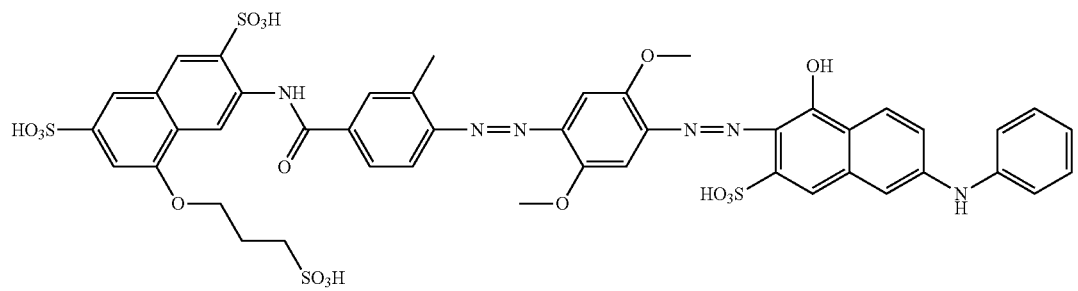
(23)
[Formula 29]
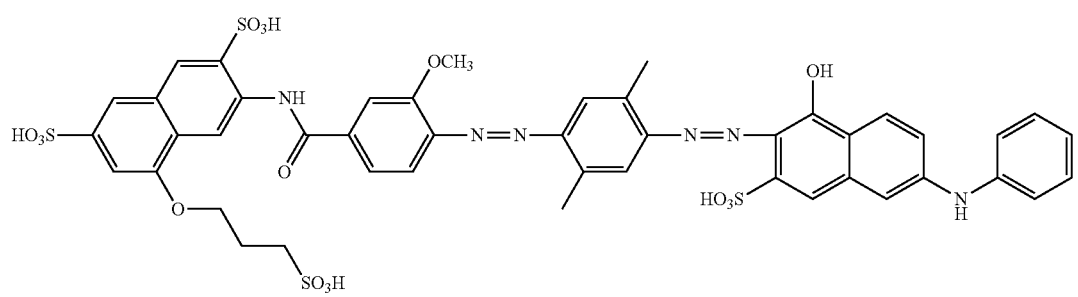
(24)
[Formula 30]
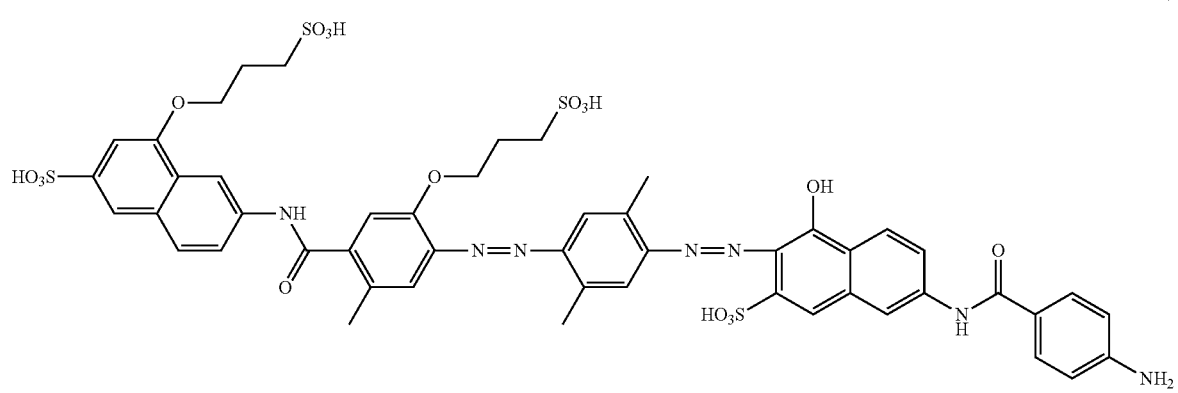
(25)

-continued
[Formula 31]
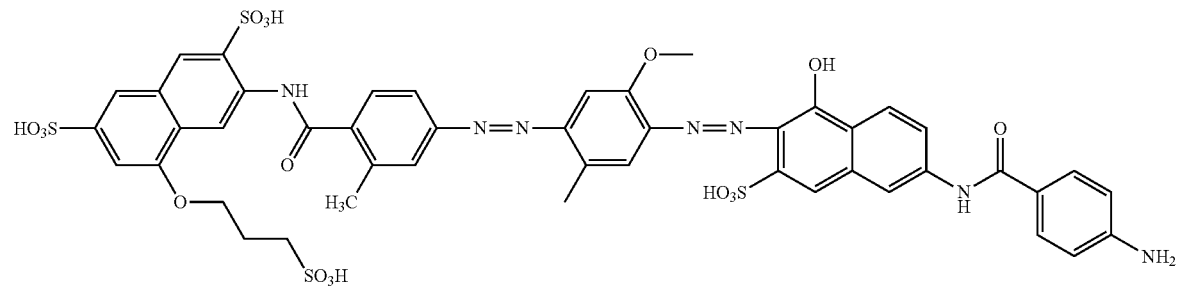
(26)
[Formula 32]
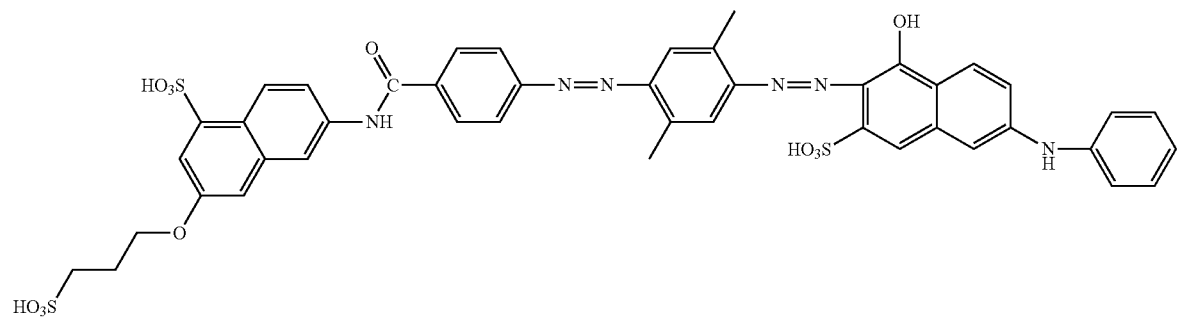
(27)
[Formula 33]
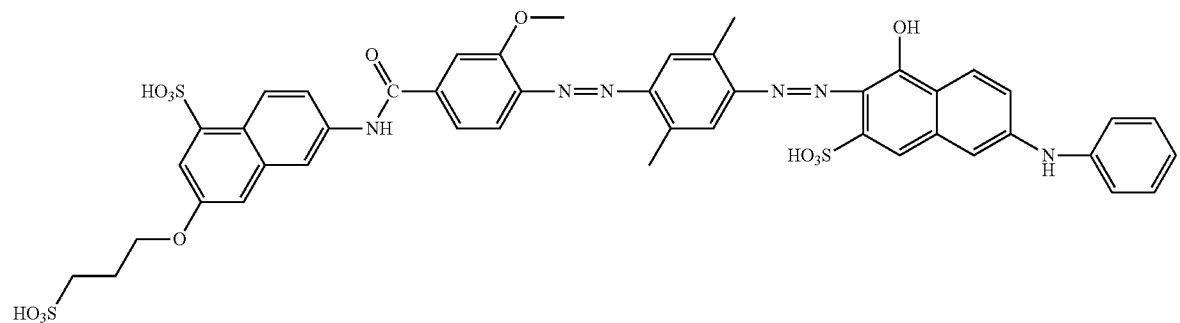
(28)
[Formula 34]
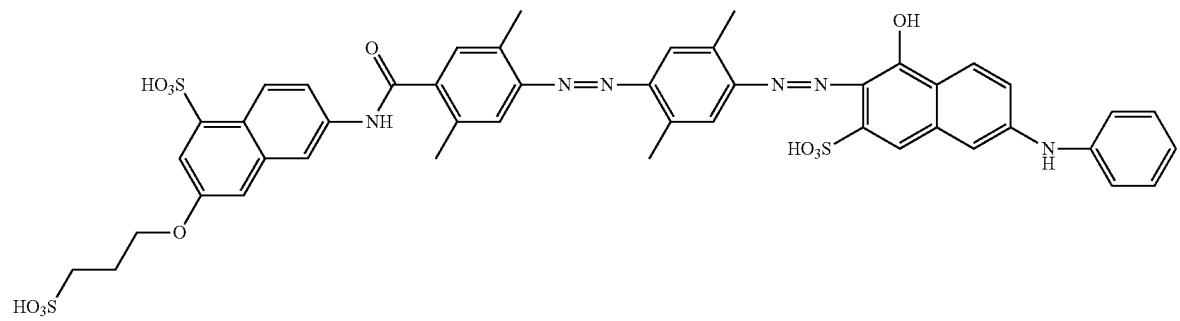
(29)

-continued
[Formula 35]
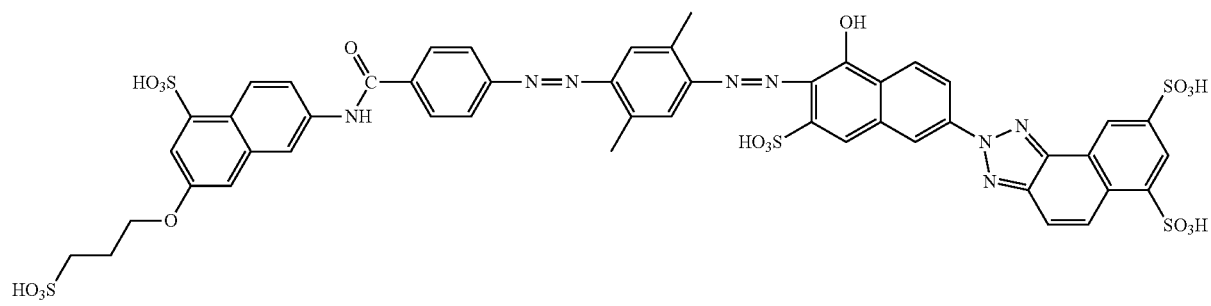
(30)
[Formula 36]
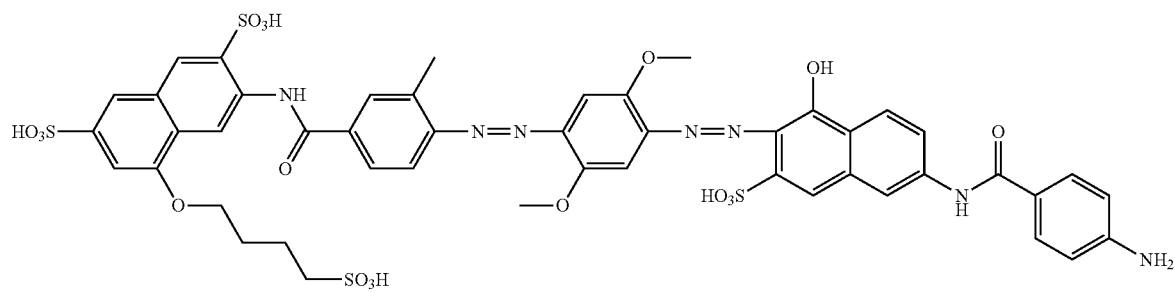
(31)
[Formula 37]
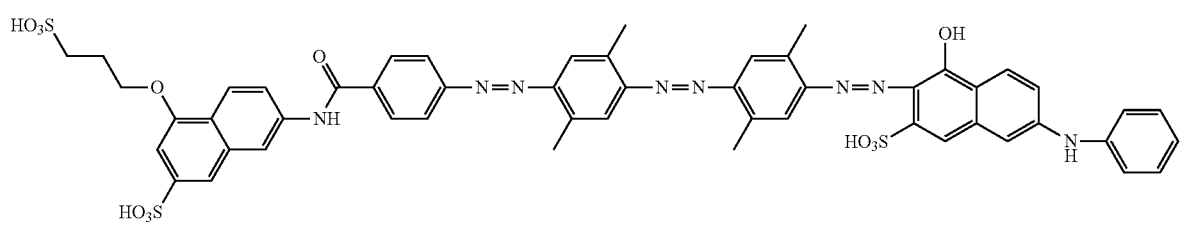
(32)
[Formula 38]
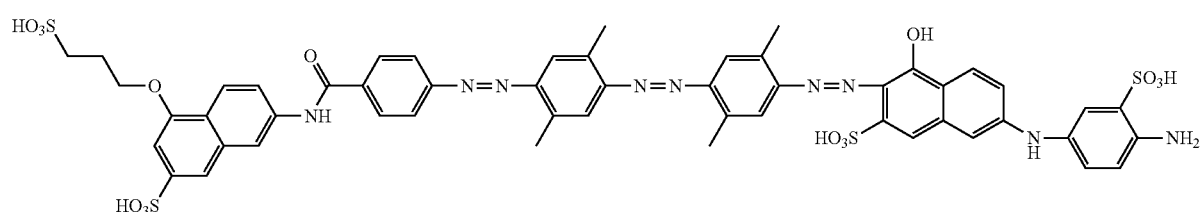
(33)
[Formula 39]
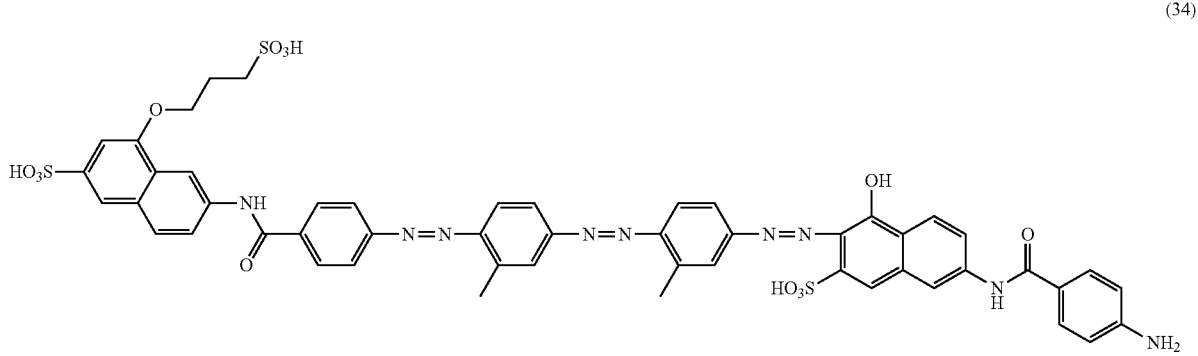
(34)

[Formula 40]
(35)
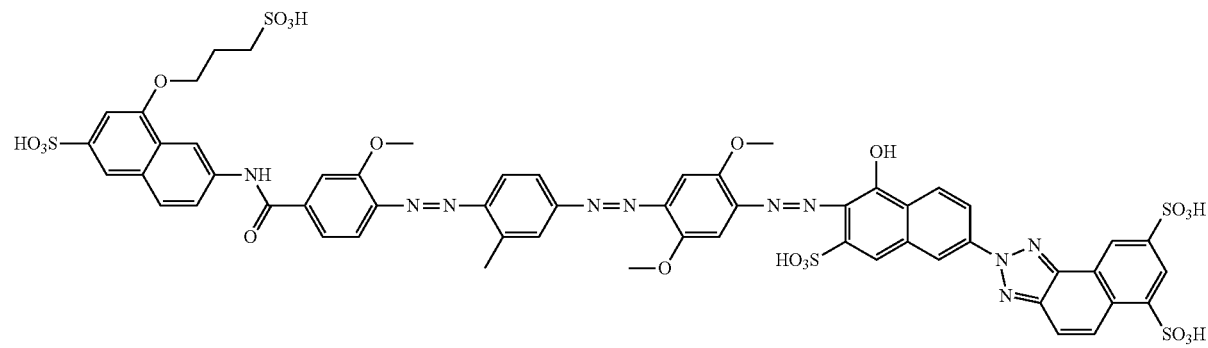
[Formula 41]
(36)
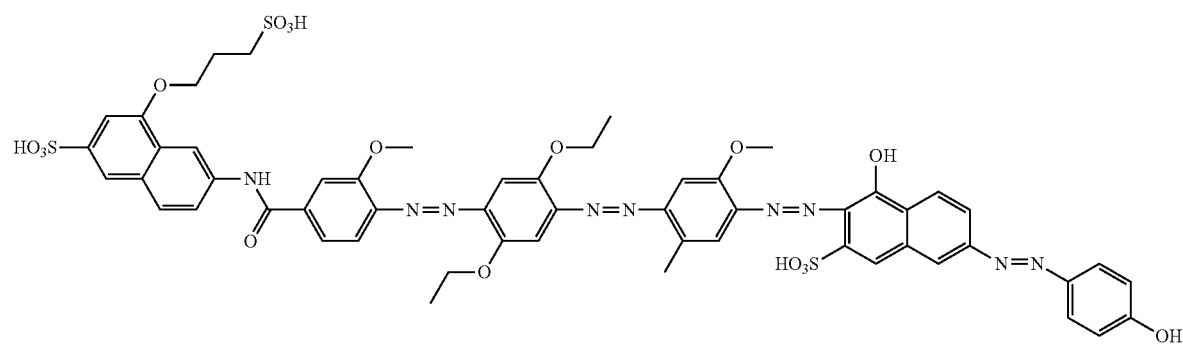
[Formula 42]
(37)
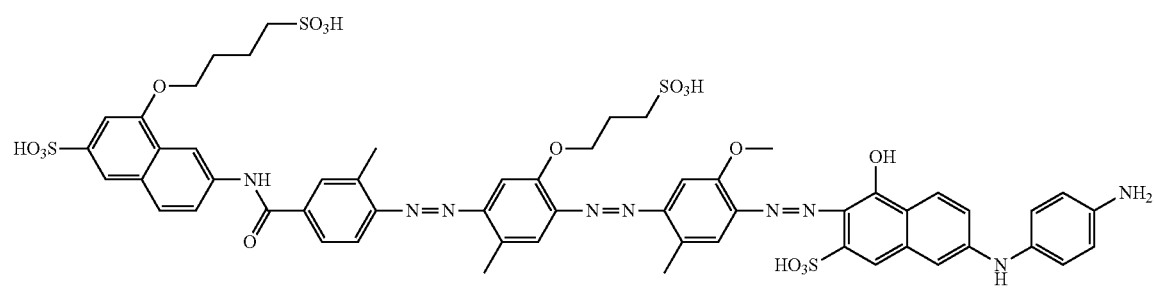
[Formula 43]
(38)
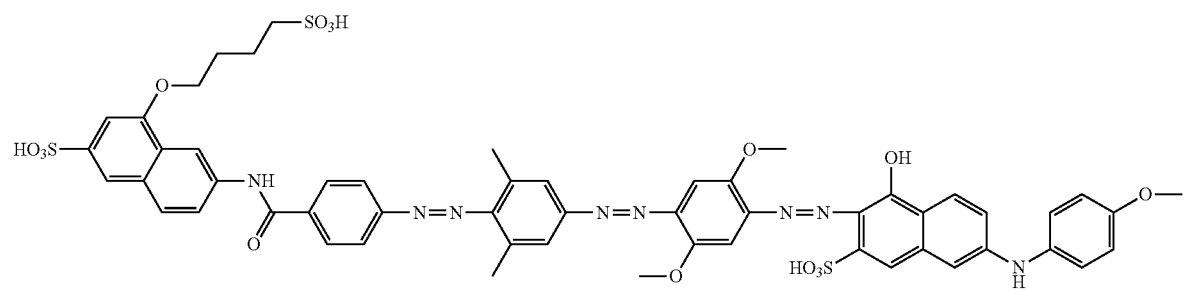

-continued
[Formula 44]
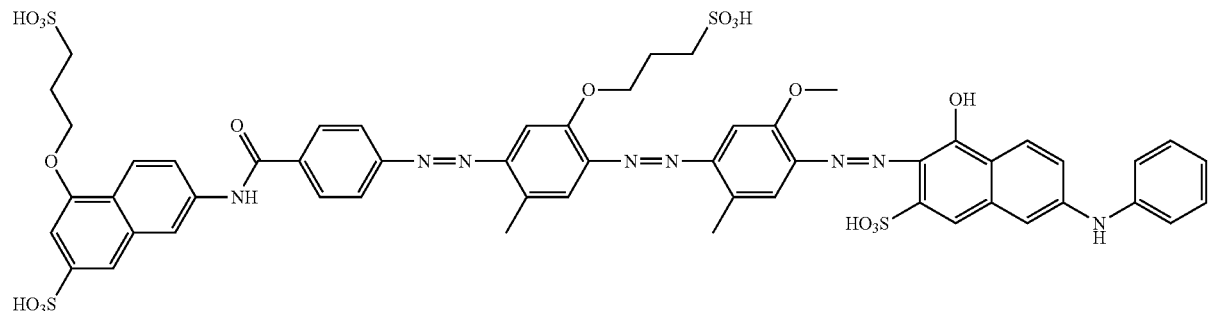
(39)
[Formula 45]
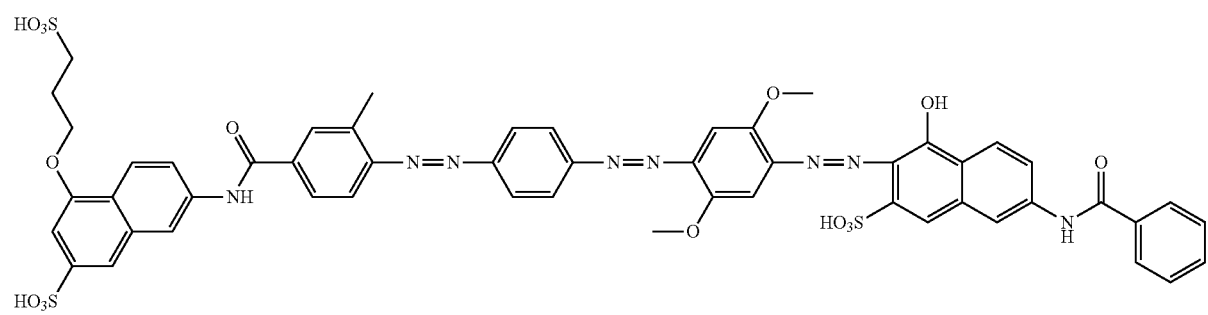
(40)
[Formula 46]
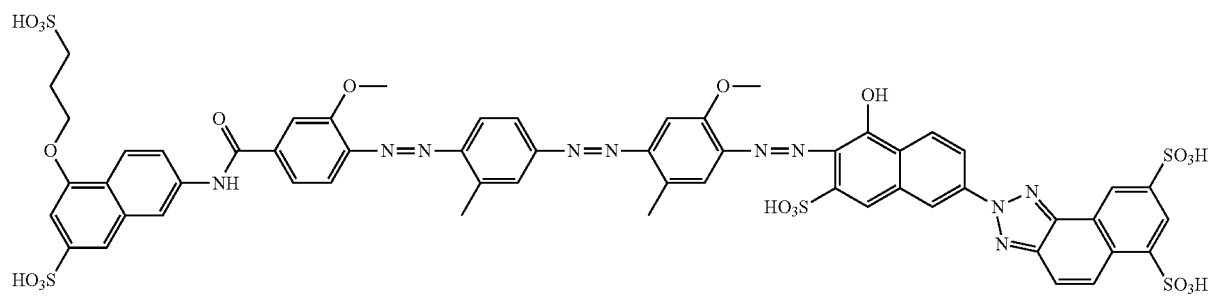
(41)
[Formula 47]
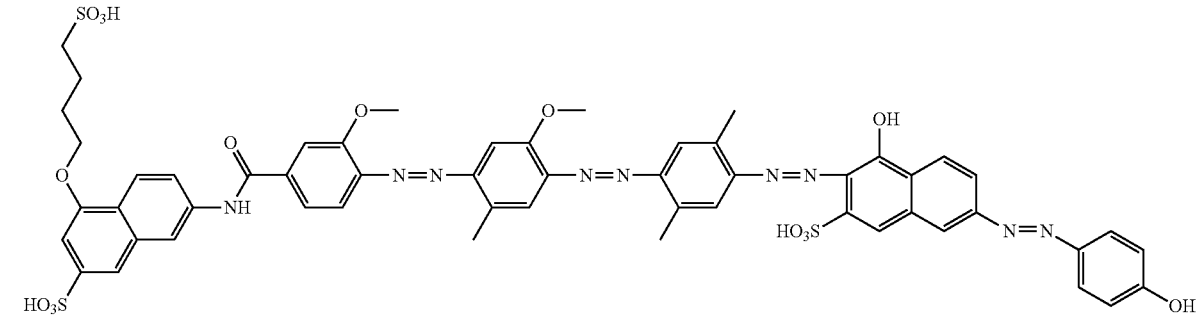
(42)

-continued
[Formula 48]
(43)
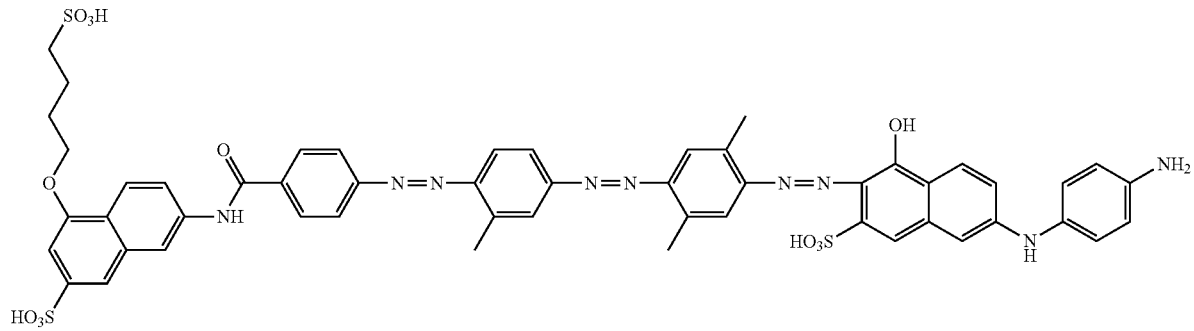
[Formula 49]
(44)
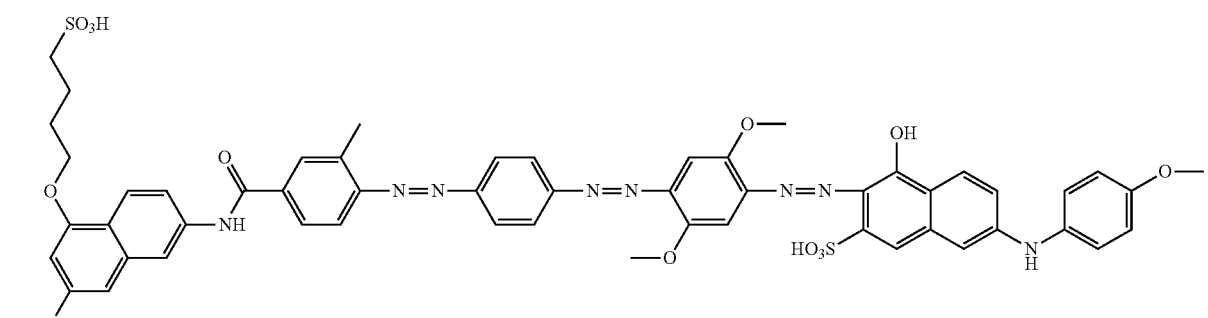
[Formula 50]
(45)
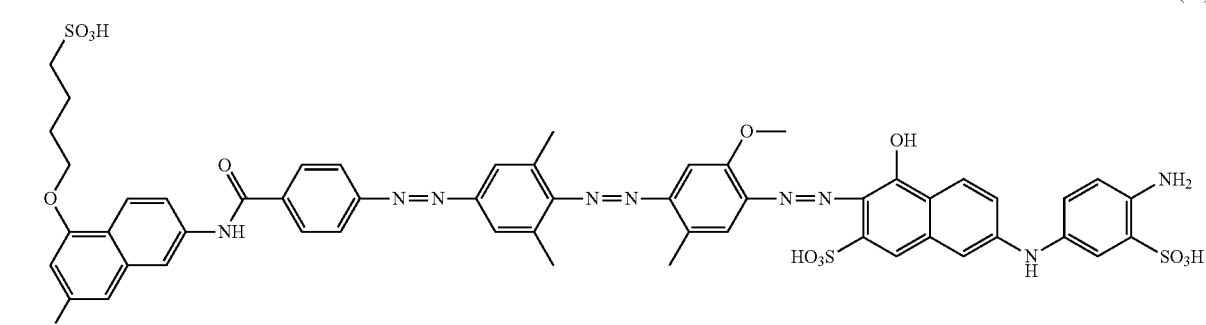
[Formula 51]
(46)
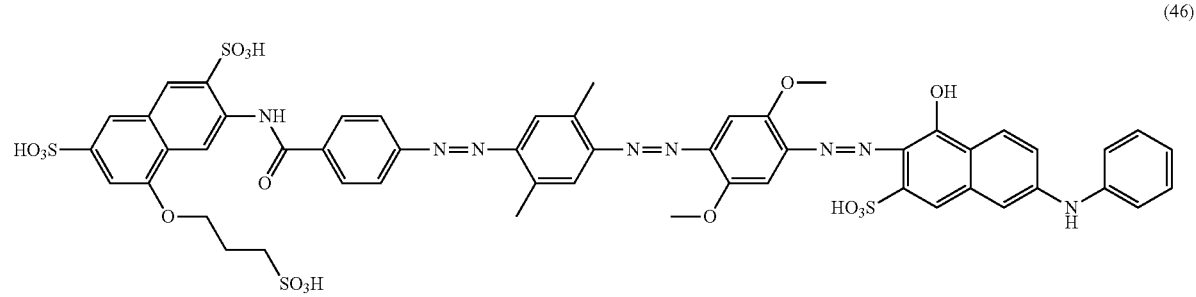

-continued
[Formula 52]
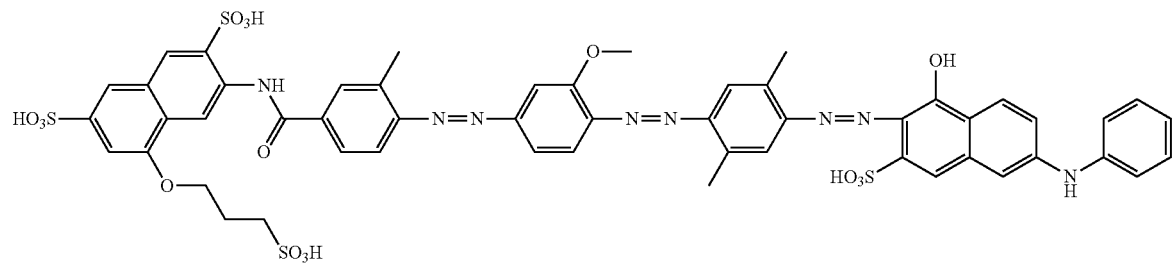
(47)
[Formula 53]
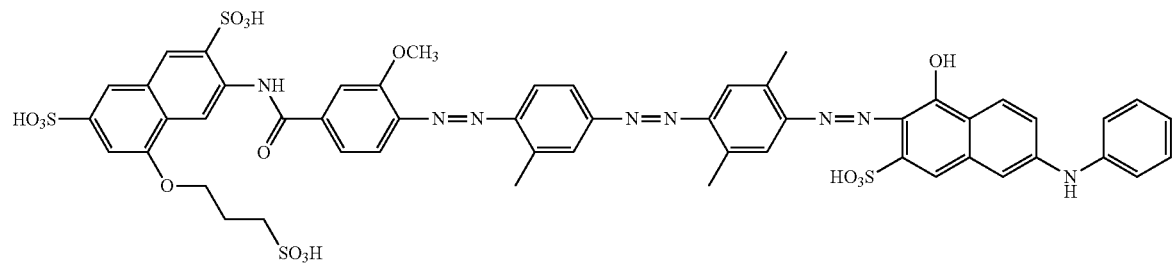
(48)
[Formula 54]
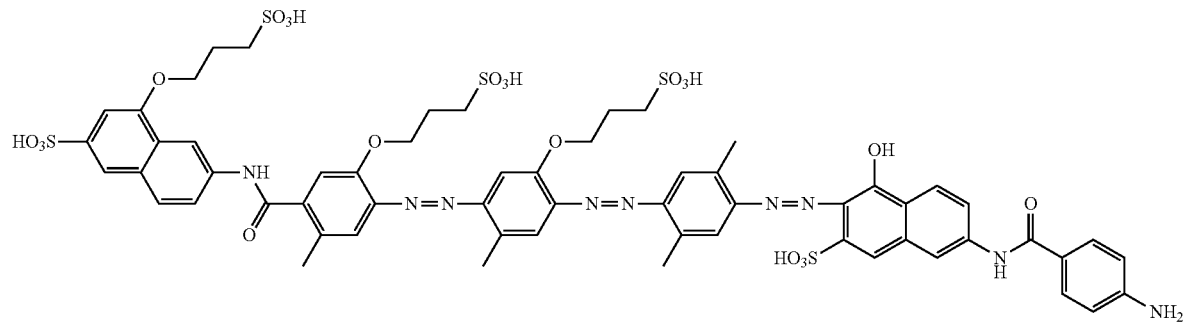
(49)
[Formula 55]
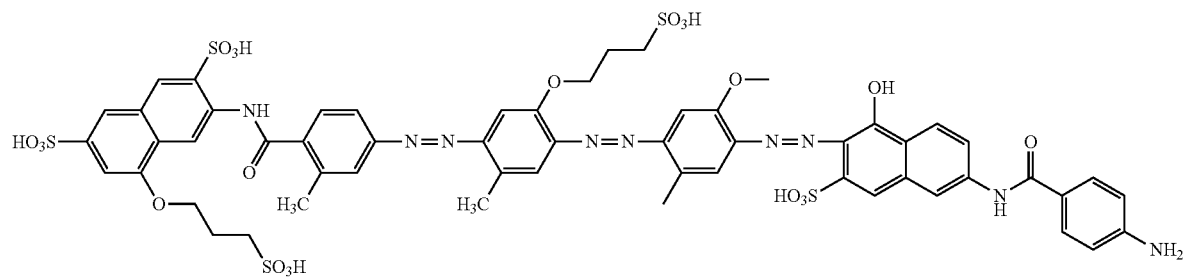
(50)

[Formula 56]
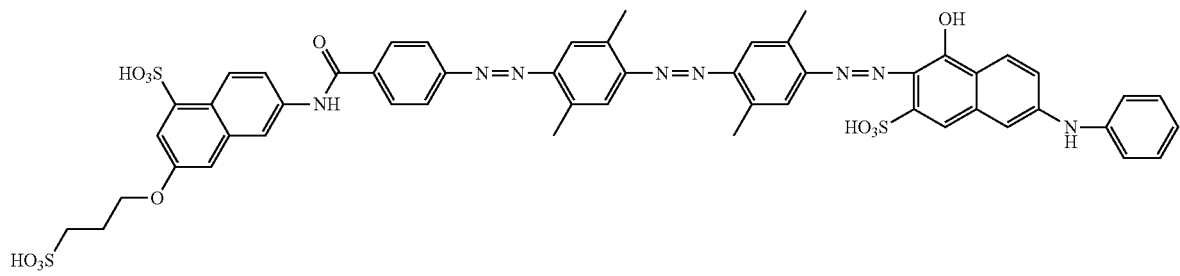
(51)
[Formula 57]
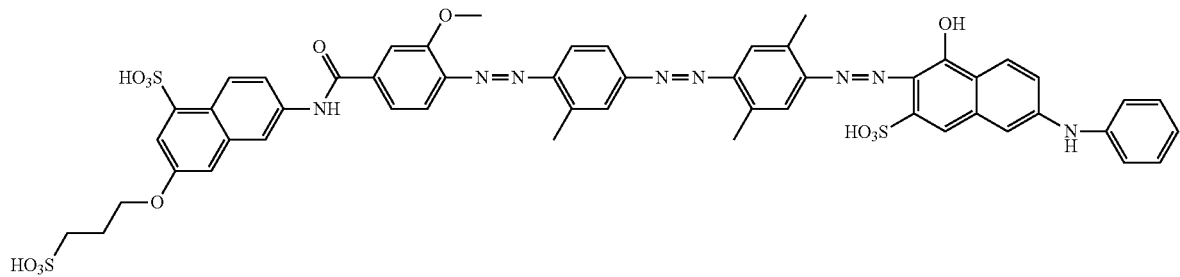
(52)
[Formula 58]
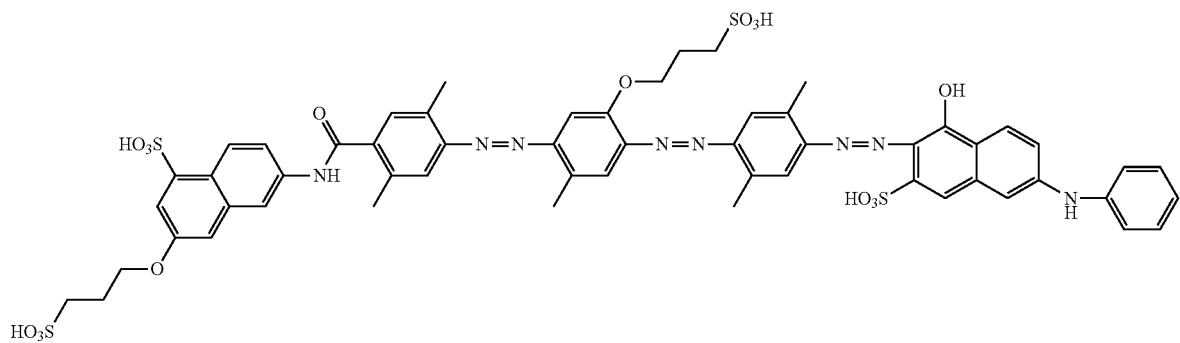
(53)
[Formula 59]
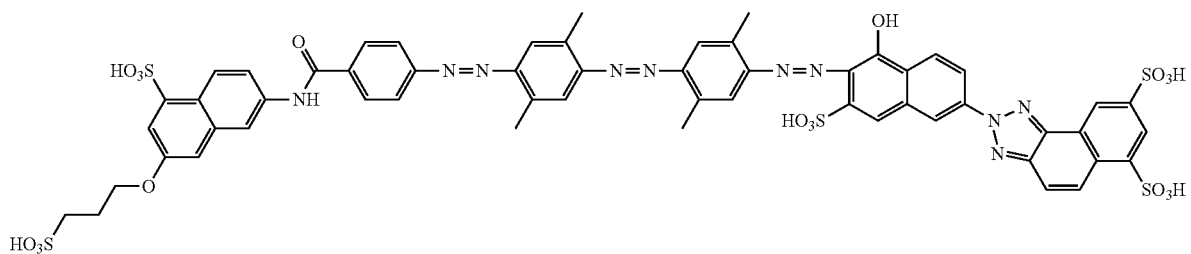
(54)

-continued
[Formula 60]
(55)
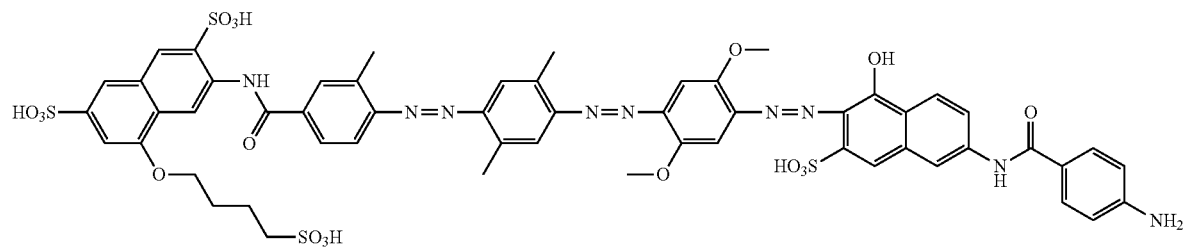
[Formula 61]
(56)
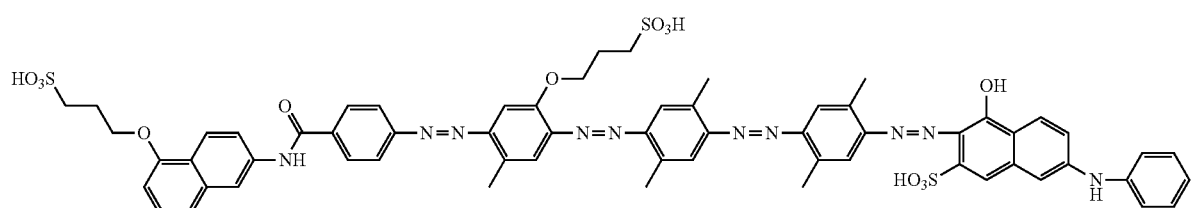
[Formula 62]
(57)
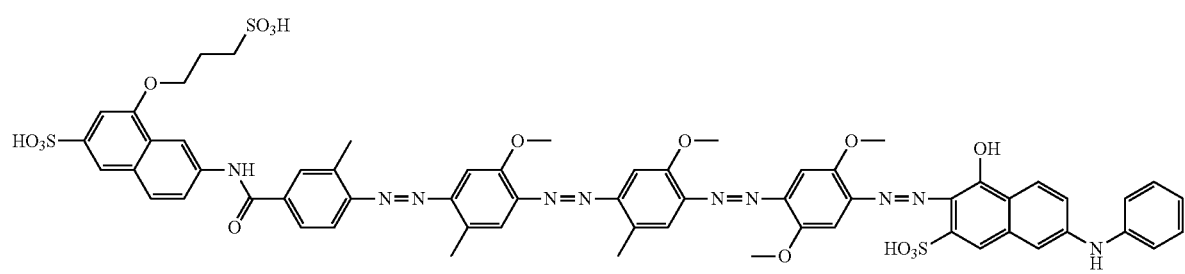
[Formula 63]
(58)
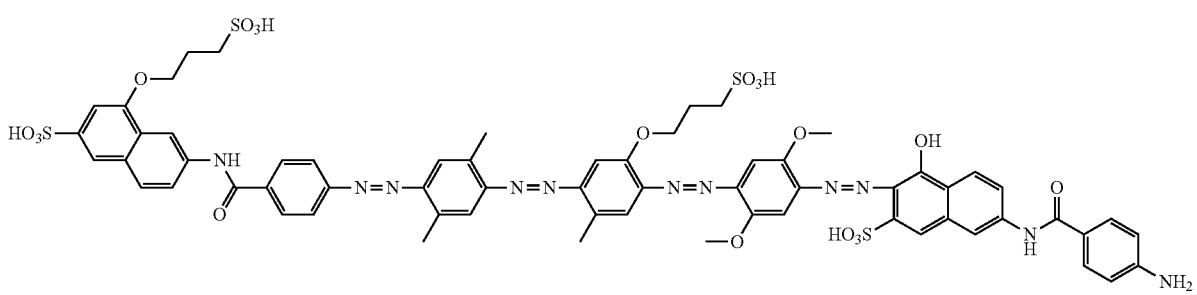
[Formula 64]
(59)
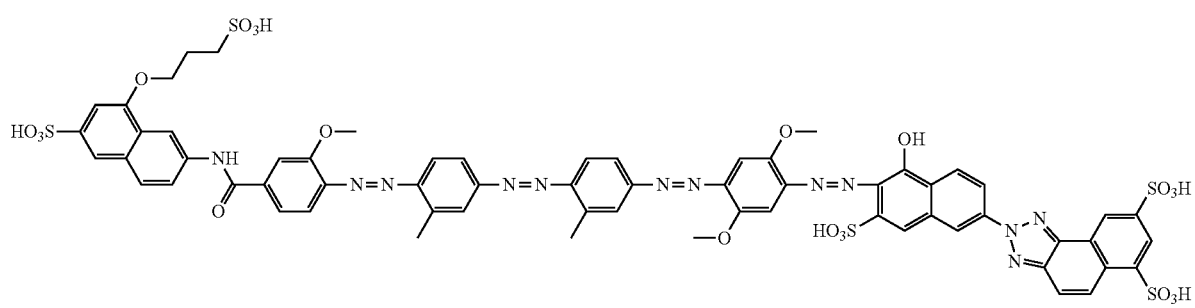

[Formula 65]
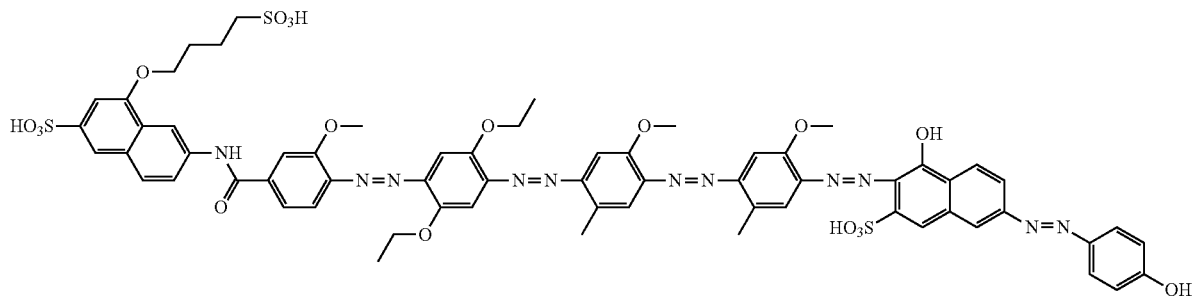
(60)
[Formula 66]
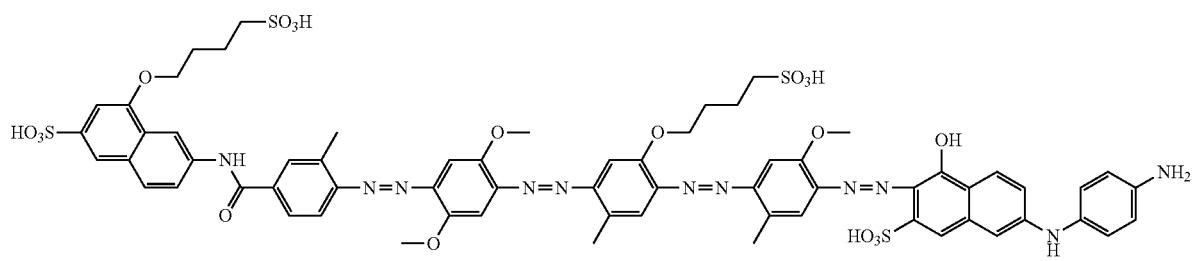
(61)
[Formula 67]
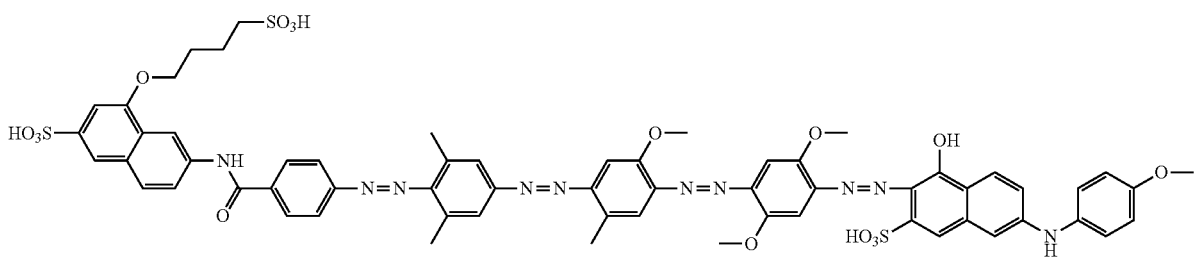
(62)
[Formula 68]
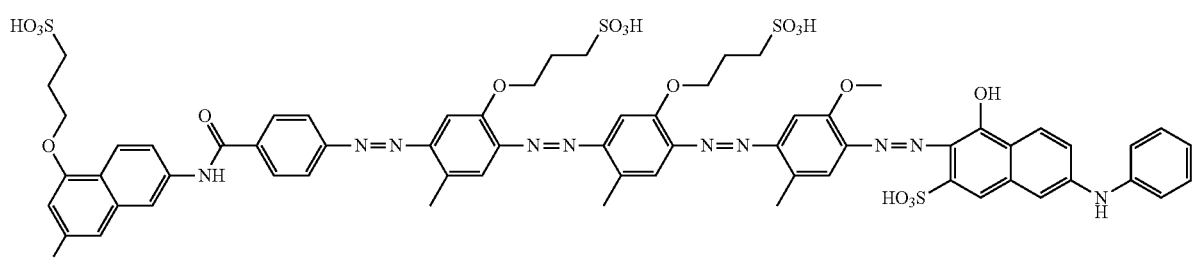
(63)
[Formula 69]
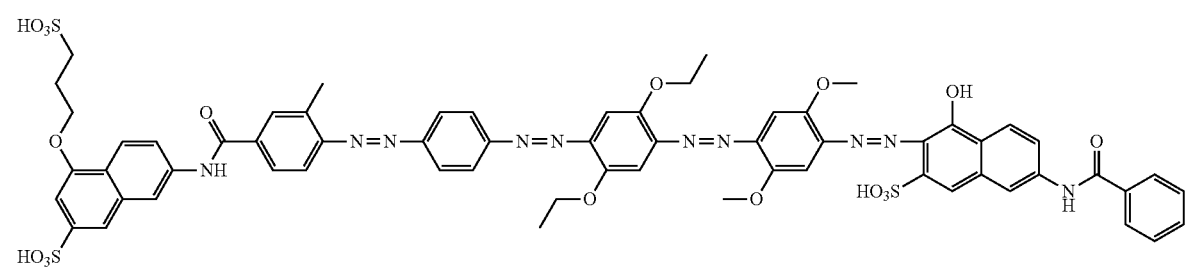
(64)

[Formula 70]
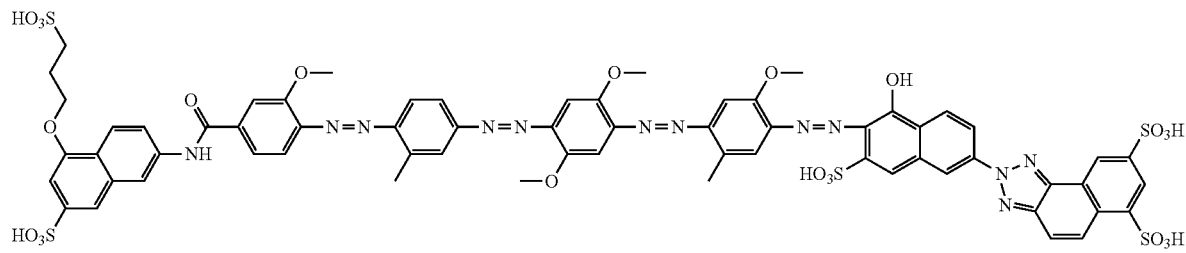
(65)
[Formula 71]
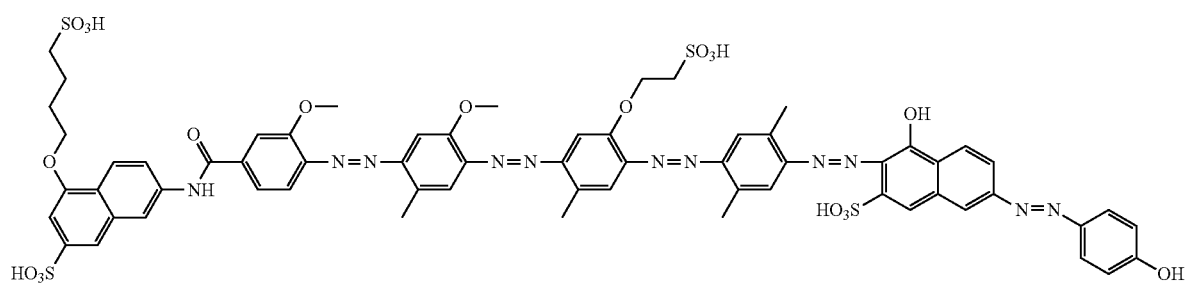
(66)
[Formula 72]
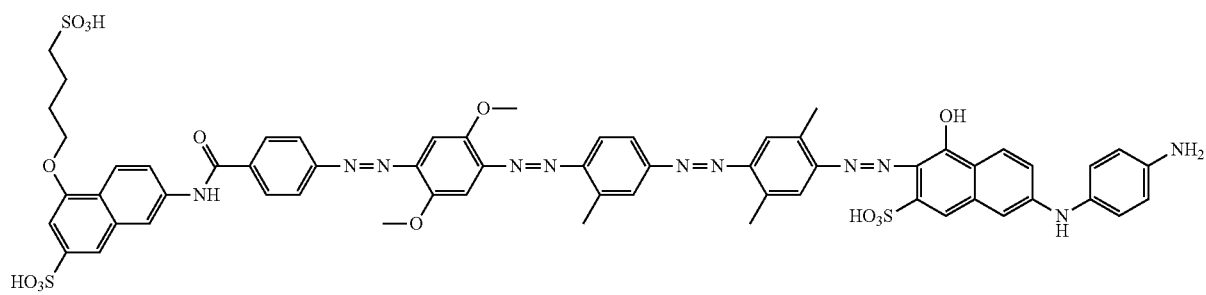
(67)
[Formula 73]
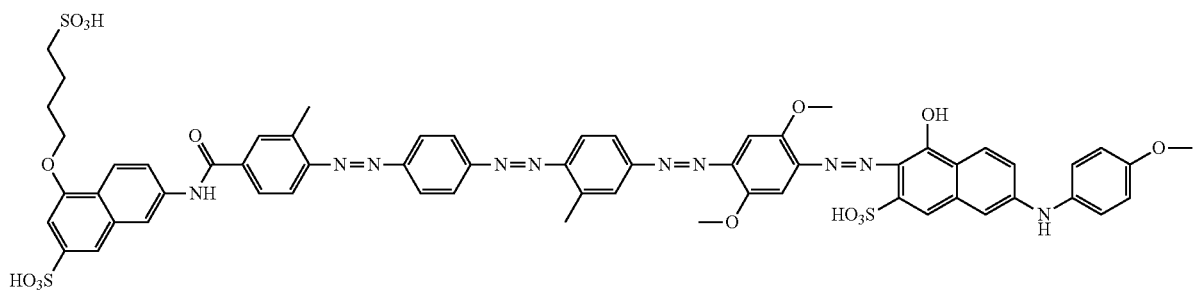
(68)

-continued
[Formula 74]
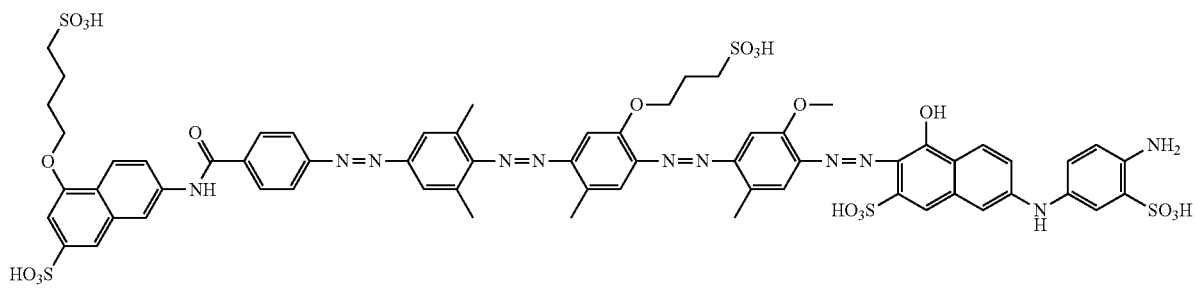
(69)
[Formula 75]
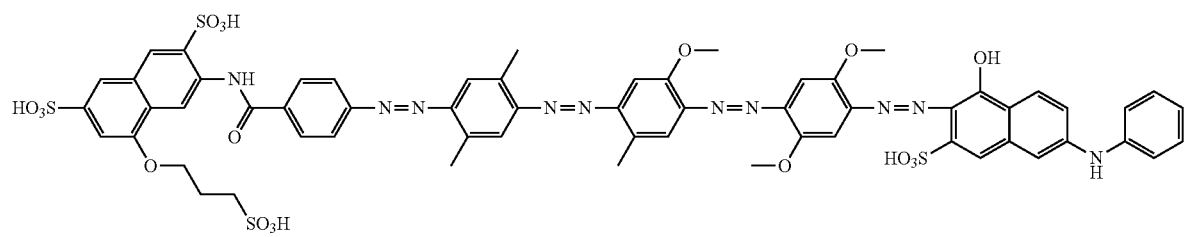
(70)
[Formula 76]
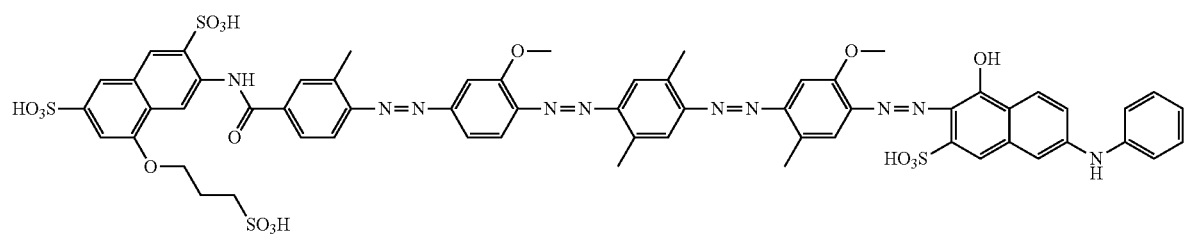
(71)
[Formula 77]
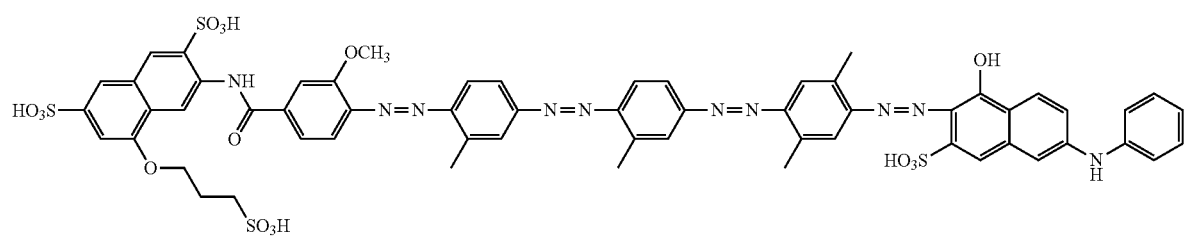
(72)
[Formula 78]
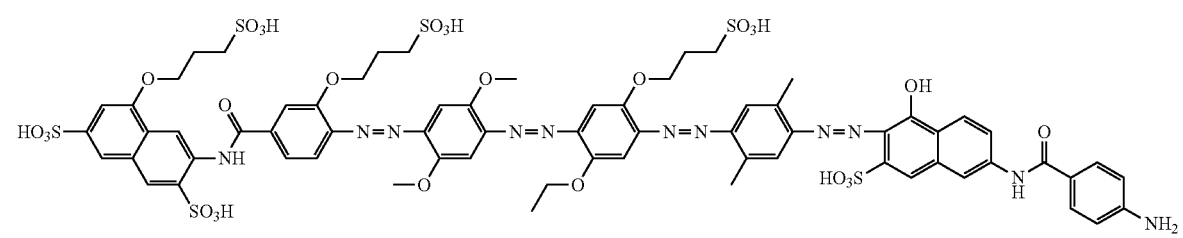
(73)

[Formula 79]
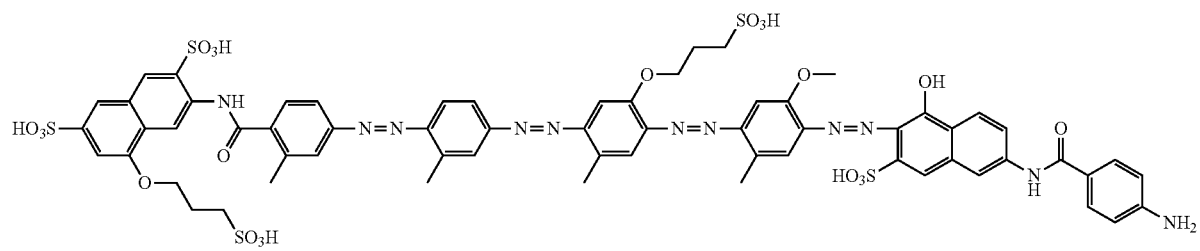
(74)
[Formula 80]
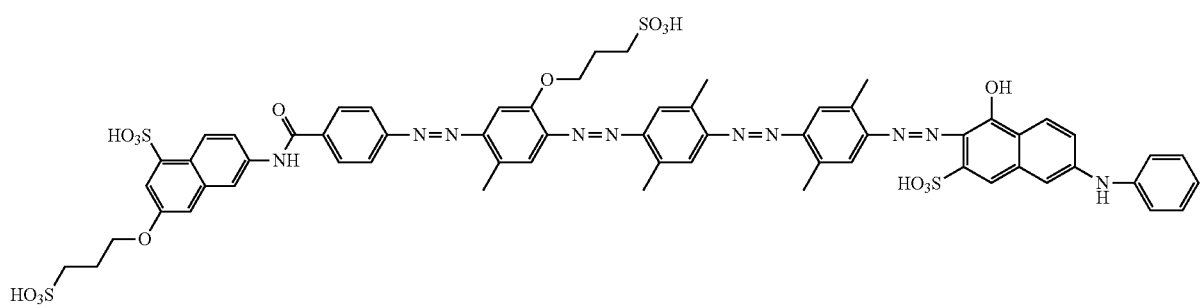
(75)
[Formula 81]
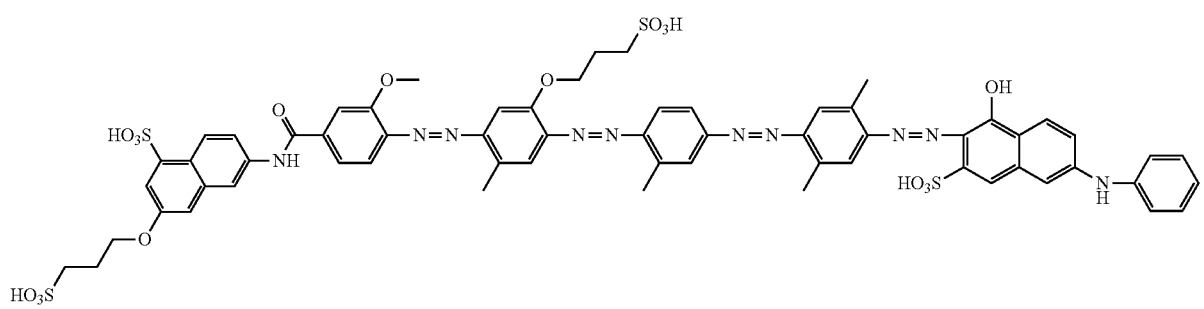
(76)
[Formula 82]
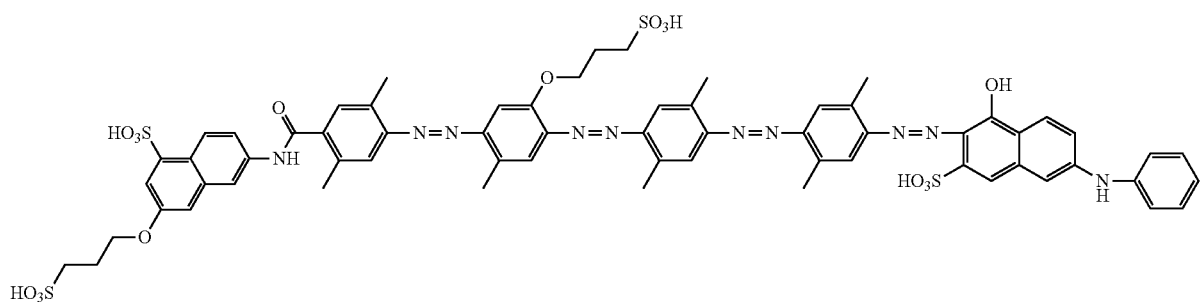
(77)

[Formula 83]

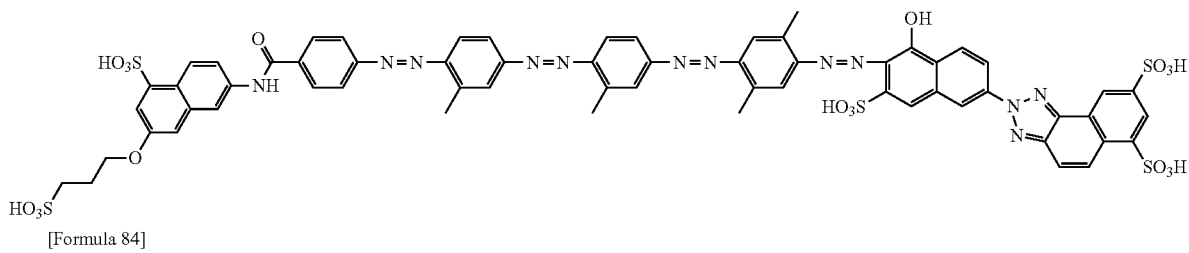

(78)

[Formula 84]

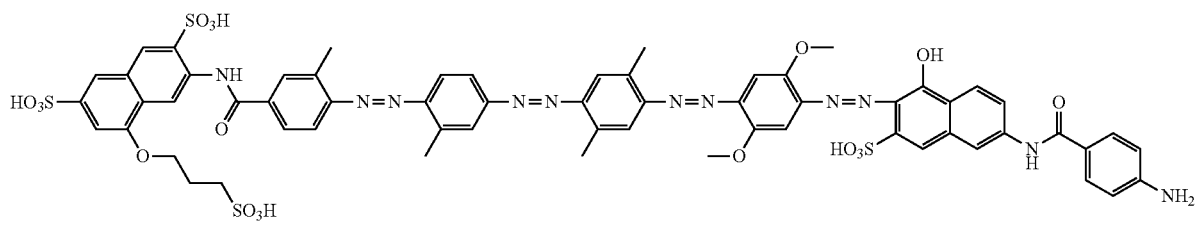

(79)

An azo compound represented by the above formula (1) or a salt thereof can be easily produced by synthesis of an intermediate, diazotization and coupling, in accordance with general sulfo-alkoxylation and a process for an azo dye as described in Patent Literature 3 and Non Patent Literature 1.

More specifically, an aminobenzoylamino naphthol sulfonic acid, for example, represented by the following formula (A), is sulfo-alkylated in the same manner as shown in Patent Literature 3, pp 11, to obtain an intermediate, an aminobenzoylamino-sulfoalkoxynaphthalene sulfonic acid represented by the following formula (B). The intermediate is diazotized and subjected to primary coupling with an aniline represented by the following formula (C) to obtain a monoazoamino compound represented by the following formula (D).

[Formula 85]

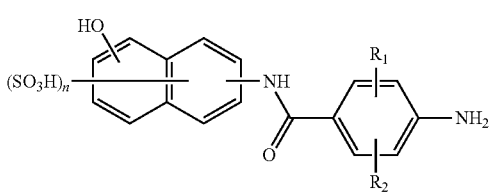

(A)

wherein n, $R_1$ and $R_2$ are the same as defined in the above formula (1).

[Formula 86]

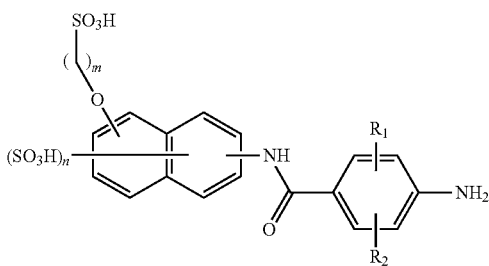

(B)

wherein n, m, $R_1$ and $R_2$ are the same as defined in the above formula (1).

[Formula 87]

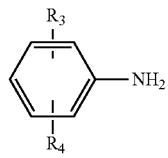

(C)

wherein $R_3$ and $R_4$ are the same as defined in the above formula (1).

[Formula 88]

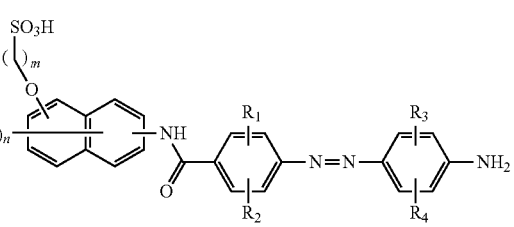

(D)

wherein m, n and $R_1$ to $R_4$ are the same as defined in the above formula (1).

An azo compound represented by the above formula (1) where p is 1 is obtained by subsequently diazotizing the monoazoamino compound (D) and performing secondary coupling with a naphthol represented by the following formula (E).

[Formula 89]

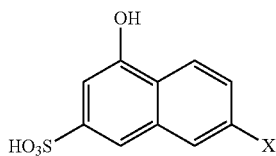

(E)

wherein X is the same as defined in the above formula (1).

An azo compound represented by the above formula (1) where p is 2 is obtained by diazotizing the monoazoamino compound (D) and performing secondary coupling with an aniline represented by the following formula (F). In this manner, the disazoamino compound represented by the following formula (G) can be obtained.

[Formula 90]

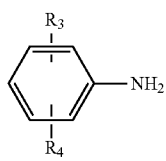

(F)

wherein $R_3$ and $R_4$ are the same as defined in the above formula (1).

[Formula 91]

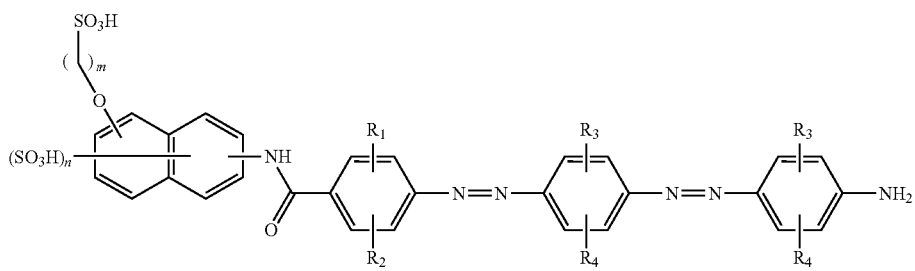

(G)

wherein m, n and $R_1$ to $R_4$ are the same as defined in the above formula (1).

The disazoamino compound (G) is diazotized and subjected to tertiary coupling with a naphthol represented by the above formula (E) to obtain an azo compound represented by the above formula (1).

An azo compound represented by the above formula (1) where p is 3 is obtained by diazotizing the disazoamino compound represented by the above formula (G) and performing tertiary coupling with an aniline represented by the following formula (H). In this manner, a trisazoamino compound represented by the following formula (I) can be obtained.

[Formula 92]

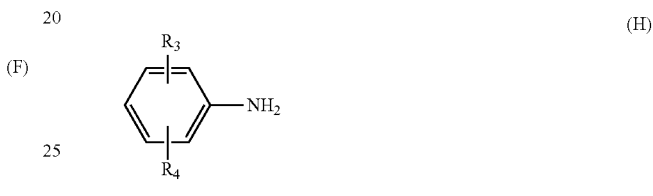

(H)

wherein $R_3$ and $R_4$ are the same as defined in the above formula (1).

[Formula 93]

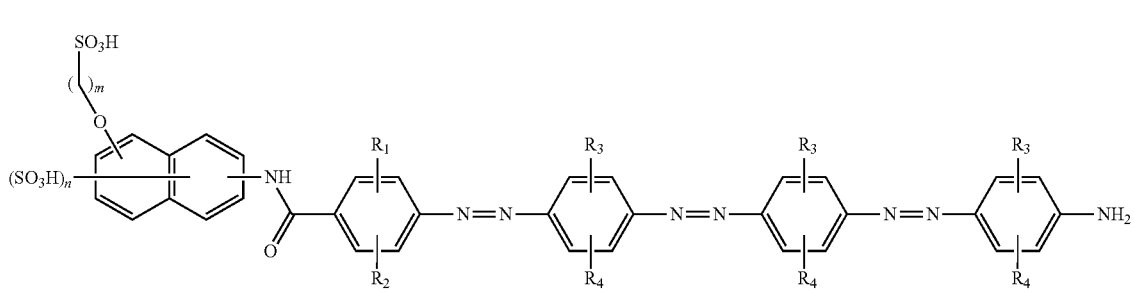

(I)

wherein m, n and $R_1$ to $R_4$ are the same as defined in the above formula (1).

The trisazoamino compound (I) is diazotized and subjected to quaternary coupling with a naphthol represented by the above formula (E) to obtain an azo compound represented by the above formula (1).

In the above reaction, the diazotization process is carried out in the normal order by adding a nitrite such as sodium nitrite to an aqueous solution or a suspension solution of a diazo component in a mineral acid such as hydrochloric acid or sulfuric acid or in the reverse order by previously adding a nitrite to a neutral or weak alkaline aqueous solution of a diazo component and mixing the resultant solution with a mineral acid. The temperature of diazotization is appropriately −10 to 40° C. The coupling step with an aniline is carried out by mixing an acidic aqueous solution of e.g., hydrochloric acid or acetic acid with each of the diazo solutions mentioned above at a temperature of −10 to 40° C. in an acidic condition of pH 2 to 7.

A monoazo compound, a disazo compound and a trisazo compound obtained by coupling are taken out directly or by precipitation (acid precipitation and salting-out) and filtration. Alternatively, these compounds can be directly subjected to a next step in the state of a solution or suspension solution. In the case where a diazonium salt is less soluble in water to form a suspension solution, the suspension solution is filtered and the resultant press cake can be used in the next coupling step.

Of the anilines having substituents represented by $R_3$ and $R_4$ and to be used in the primary, secondary or tertiary coupling, an aniline having an alkoxy group having a sulfo group (sulfoalkoxyaniline) is more specifically produced by sulfoalkylation of a phenol in accordance with the process shown in Patent Literature 3, pp 35, followed by reduction, and can be used in a coupling step.

A secondary, tertiary or quaternary coupling reaction between a diazotized compound of mono, dis or tris azo amino compound and a naphthol represented by formula (E) is carried out at a temperature of −10 to 40° C. in an neutral to alkaline condition of pH7 to 10. After completion of the reaction, the resultant product is precipitated by salting-out, filtered and taken out. Furthermore, if purification is required, salting-out is repeated or the product may be precipitated from water by using an organic solvent. Examples of the organic solvent to be used in purification include water-soluble organic solvents such as alcohols including methanol and ethanol and ketones including acetone.

Note that, in the present invention, an azo compound represented by the above formula (1) is used as a free acid, a salt of an azo compound can be used. Examples of such a salt include alkali metal salts such as a lithium salt, a sodium salt and a potassium salt, and organic salts such as an ammonium salt and an amine salt. Generally, a sodium salt is used.

Examples of a substituent for an aminobenzoylaminosulfoalkoxynaphthalene sulfonic acid and serving as a starting material for synthesizing a water-soluble dye represented by the above formula (1) include a sulfo group (a substituent on a naphthalene side), a lower alkoxy group having a sulfo group and an aminobenzoyl group having a substituent. As the lower alkoxy group having a sulfo group, a straight-chain alkoxy group is preferable, and the substitution position with a sulfo group is preferably present at an end of an alkoxy group. The lower alkoxy group herein preferably refers to an alkoxyl group having 1 to 4 carbon atoms. As the lower alkoxy group having a sulfo group, either 3-sulfopropoxy group or 4-sulfobutoxy group is preferable. As the substituent for the aminobenzoyl group having a substituent, a hydrogen atom, a lower alkyl group, a lower alkoxy group, a sulfo group or a lower alkoxy group having a sulfo group is mentioned; more preferably, a hydrogen atom, a methyl group, an ethyl group, a methoxy group, an ethoxy group, a sulfo group or a lower alkoxy group having a sulfo group, (which is a straight-chain alkoxy group and the substitution position with a sulfo group is an end of the alkoxy group, 3-sulfopropoxy group or 4-sulfobutoxy group is further preferable) is mentioned; and particularly preferably, a hydrogen atom, a methyl group, a methoxy group or a 3-sulfopropoxy group is mentioned. The substitution positions are preferably the 2-position alone, the 5-position alone, a combination of the 2-position and the 6-position, a combination of the 2-position and the 5-position and a combination of the 3-position and the 5-position, and particularly preferably, the 2-position alone, the 5-position alone and a combination of the 2-position and the 5-position on the benzoyl side as shown in the above formula (7). Note that, the 2-position alone and the 5-position alone mean that a single substituent other than a hydrogen atom is present at the 2-position and the 5-position, respectively. Examples of the aminobenzoylaminosulfoalkoxynaphthalene sulfonic acids represented by the above formula (B) include 7-(4-aminobenzoylamino)-4-(3-sulfopropoxy)naphthalene-2-sulfonic acid, 7-(4-aminobenzoylamino)-4-(4-sulfobutoxy)naphthalene-2-sulfonic acid, 6-(4-aminobenzoylamino)-4-(3-sulfopropoxy)naphthalene-2-sulfonic acid, 6-(4-aminobenzoylamino)-4-(4-sulfobutoxy)naphthalene-2-sulfonic acid, 3-(4-aminobenzoylamino)-5-(3-sulfopropoxy)naphthalene-2,7-disulfonic acid, 3-(4-amino-benzoylamino)-5-(4-sulfobutoxy)naphthalene 2,7-disulfonic acid, 6-(4-aminobenzoylamino)-3-(3-sulfopropoxy)naphthalene-1-sulfonic acid, 6-(4-aminobenzoylamino)-3-(4-sulfobutoxy)naphthalene-1-sulfonic acid, 6-(4-amino-3-methylbenzoylamino)-4-(3-sulfopropoxy)naphthalene-2-sulfonic acid, 6-(4-amino-3-methoxybenzoylamino)-4-(4-sulfobutoxy)naphthalene-2-sulfonic acid, 6-(4-amino-3-methoxybenzoylamino)-4-(3-sulfopropoxy)naphthalene-2-sulfonic acid, 6-(4-amino-3-methylbenzoylamino)-4-(4-sulfobutoxy)naphthalene-2-sulfonic acid, 7-(4-amino-3-methoxybenzoylamino)-4-(3-sulfopropoxy)naphthalene-2-sulfonic acid, 6-[4-amino-2-methyl-5-(3-sulfopropoxy)benzoylamino]-4-(3-sulfopropoxy)naphthalene-2-sulfonic acid, 7-(4-amino-3-methyl-benzoylamino)-4-(3-sulfopropoxy)naphthalene-2-sulfonic acid, 7-(4-amino-3-methylbenzoylamino)-4-(4-sulfobutoxy)naphthalene-2-sulfonic acid, 7-(4-amino-3-methoxybenzoylamino)-4-(4-sulfobutoxy)naphthalene-2-sulfonic acid, 3-(4-amino-3-methylbenzoylamino)-5-(3-sulfopropoxy)naphthalene-2,7-disulfonic acid, 3-(4-amino-3-methoxybenzoylamino)-5-(3-sulfopropoxy)naphthalene-2,7-disulfonic acid, 3-(4-amino-3-methylbenzoylamino)-5-(4-sulfobutoxy)naphthalene-2,7-disulfonic acid, 6-(4-amino-2,5-dimethylbenzoylamino)-3-(4-sulfobutoxy)naphthalene-1-sulfonic acid, and 6-(4-amino-3-methoxybenzoylamino)-3-(3-sulfopropoxy)naphthalene-1-sulfonic acid.

As a substituent of a primary, secondary or tertiary coupling component, i.e., an aniline having a substituent ($R_3$ and $R_4$), a hydrogen atom, a lower alkyl group, a lower alkoxyl group or a lower alkoxy group having a sulfo group is mentioned; preferably, a hydrogen atom, a methyl group, a methoxy group, a 3-sulfopropoxy group or 4-sulfobutoxy group is mentioned; and more preferably, a hydrogen atom, a methyl group, a methoxy group or 3-sulfopropoxy group is mentioned. One or two of the substituents may be bonded.

The binding positions of the substituents are the 2-position, 3-position, and a combination of 2-position and 5-position, a combination of 3-position and 5-position, or a combination of 2-position and 6-position; however, the 3-position and a combination of 2-position and 5-position are preferable. Examples of the aniline having a lower alkoxyl group having a sulfone group include 3-(2-amino-4-methylphenoxy)propane-1-sulfonic acid, 3-(2-aminophenoxy)propane-1-sulfonic acid and 3-(2-amino-4-methylphenoxy)butane-1-sulfonic acid. As the anilines other than the above, for example, an aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline or 3,5-dimethoxyaniline is mentioned. In these anilines, an amino group may be protected. As the protecting group, for example, a co-methane sulfone group thereof is mentioned. In the case where p is 2, the anilines to be used in primary coupling and secondary coupling may be the same or different. In the case where p is 3, the anilines to be used in primary coupling and secondary and/or tertiary coupling may be the same or different.

As X of a naphthol (the secondary, tertiary or quaternary coupling component) having X, a phenylamino group having a substituent, a benzoylamino group having a substituent, a phenylazo group having a substituent or a naphthotriazole group having a substituent is mentioned. As the substituent, a hydrogen atom, a lower alkyl group, a lower alkoxyl group, a hydroxyl group, a carboxyl group, a sulfonic group or a substituted amino group is preferable.

In the case where X represents a phenylamino group having a substituent, a phenylamino group having substituents ($R_5$, $R_6$) and represented by formula (2) is preferable. The substituents ($R_5$, $R_6$) each independently represent a hydrogen atom, a methyl group, a methoxy group, a sulfo group, an amino group or a substituted amino group, and more preferably a hydrogen atom, a methyl group, a methoxy group or an amino group. At least one substituent is more preferably present at the p-position relative to the amino group. For example, a phenylamino group, a 4-methylphenylamino group, a 4-methoxyphenylamino group, a 4-aminophenylamino group, a 4-amino-2-sulfophenylamino group, a 4-amino-3-sulfophenylamino group, a 4-sulfomethylaminophenylamino group or a 4-carboxyethyl aminophenylamino group is mentioned.

In the case where X represents a benzoylamino group having a substituent, a benzoylamino group having a substituent ($R_7$) and represented by formula (3) is preferable. The substituent ($R_7$) represents a hydrogen atom, a hydroxy group, an amino group or a substituted amino group, and preferably a hydrogen atom, an amino group or a substituted amino group. The substitution position is more preferably the p-position. As the benzoylamino group having a substituent, for example, a benzoylamino group, a 4-aminobenzoylamino group, a 4-hydroxybenzoylamino group or a 4-carboxyethyl-aminobenzoylamino group is mentioned.

In the case where X represents a naphthotriazole group having a substituent, a naphthotriazole group having a sulfone group and represented by formula (4) is preferable. Reference symbol o represents 1 or 2 and preferably 2. For example, a 6,8-disulfonaphthotriazole group, a 7,9-disulfonaphthotriazole group, a 7-sulfonaphthotriazole group or a 5-sulfonaphthotriazole group is mentioned.

In the case where X represents a phenylazo group having a substituent, a phenylazo group having substituents ($R_8$ to $R_{10}$) and represented by formula (5) is preferable. The substituents ($R_8$ to $R_{10}$) each independently represent a hydrogen atom, a hydroxy group, a lower alkyl group, a lower alkoxy group, an amino group or a substituted amino group. A single substitution is preferable. As the substituent, a hydroxy group, an amino group or a substituted amino group is more preferable. As the phenylazo group having a substituent, for example, a 2-methylphenylazo group, a 3-methylphenylazo group, a 2,5-dimethylphenylazo group, 3-methoxyphenylazo group, a 2-methoxy-5-methylphenylazo group, a 2,5-dimethoxyphenylazo group, a 4-aminophenylazo group, a 4-hydroxyphenylazo group or a 4-carboxyethylaminophenylazo group is mentioned, and a 4-aminophenylazo group, a 4-hydroxyphenylazo group or a 4-carboxyethylaminophenylazo group is preferable.

In the dye polarizing film or dye polarizing plate of the present invention, the azo compounds represented by the above formula (1) or salts thereof are used alone or in combination. If necessary, organic dyes other than the azo compound or a salt thereof of the invention may be used singly or in combination. The organic dye(s) to be used in combination are not particularly limited, however, dyes having absorption properties in an absorption wavelength range different from that of the azo compound of the present invention or a salt thereof and highly dichroic is preferable. Typical examples thereof include C. I. Direct Yellow 12, C. I. Direct Yellow 28, C. I. Direct Yellow 44, C. I. Direct Orange 26, C. I. Direct Orange 39, C. I. Direct Orange 71, C. I. Direct Orange 107, C. I. Direct Red 2, C. I. Direct Red 31, C. I. Direct Red 79, C. I. Direct Red 81, C. I. Direct Red 247, C. I. Direct Green 80, C. I. Direct Green 59 and dyes described in Patent Literatures 1 to 7. Depending upon the purpose, dyes developed for polarizing plates like dyes described in Patent Literatures 1 to 7 are more preferably used. These pigments (dyes) are used in the form of free acids, alkali metal salts (for example, Na salt, K salt, Li salt), ammonium salts or amine salts.

In the case where an organic dye other than the azo compound or a salt thereof of the invention is optionally used in combination, the type of dye to be blended varies depending upon the type of desired polarizing film (e.g., neutral color polarizing film, a color polarizing film for a liquid-crystal projector or another color polarizing film). The mixing ratio thereof, which is not particularly limited, the mixing ratio of the organic dye(s) in total is preferably 0.1 to 10 parts by mass based on the mass of the azo compound represented by the above formula (1) or a salt thereof.

An azo compound represented by formula (1) or a salt thereof and an optional dye(s) are added to a polarizing-film base (for example, a polymer film) in accordance with a method known in the art and oriented, and further mixed with a liquid crystal or oriented by a coating method. In such a manner, polarizing films different in color or having neutral color can be produced. The polarizing film obtained is used as a polarizing plate by providing a protecting film thereto. Alternatively, if an optional protecting layer or AR (antireflection) layer, and a support or the like are provided, the polarizing film is used in e.g., an LCD projector, a calculator, a watch, a laptop computer, a word processor, a liquid crystal display TV, a car navigation, an indoor/outdoor measuring instrument and indicator, and used as a lens and a glasses.

A polarizing-film base (polymer film) to be used in the dye polarizing film of the present invention is preferably a film formed of a polyvinyl alcohol resin or a derivative thereof. As a specific example thereof, a polyvinyl alcohol or a derivative thereof and a polyvinyl alcohol or a derivative thereof modified with an olefin such as ethylene and propylene or an unsaturated carboxylic acid such as crotonic acid, acrylic acid, methacrylic acid or maleic acid, are mentioned. Of them, a film formed of a polyvinyl alcohol or a derivative thereof is preferably used in view of dye adsorption and orientation. The thickness of the base material is usually 30 to 100 μm and preferably about 50 to 80 μm.

For adding an azo compound represented by formula (1) or a salt thereof to such a polarizing-film base (polymer film), usually a method of staining a polymer film is employed. The staining is, for example, performed as follows. First, an azo compound according to the present invention or a salt thereof and optional dye(s) other than the azo compound or a salt thereof are dissolved in water to prepare a dye bath. The dye concentration of the dye bath, which is not particularly limited, is selected from the range of normally about 0.001 to 10 mass %. If necessary, a staining aid may be used; for example, salt cake is preferably used in a concentration of about 0.1 to 10 mass %. In the dye bath thus prepared, a polymer film is soaked for 1 to 10 minutes to stain the film. The staining temperature is preferably about 40 to 80° C.

Orientation of an azo compound represented by formula (1) or a salt thereof is provided by stretching the polymer film stained as described above. As the stretching method, for example, any method known in the art such as a wet method and a dry method may be used. The polymer film may be stretched before staining as the case may be. In this case, at the time of staining, orientation of water-soluble dye is given. The polymer film having a water-soluble dye added thereto and oriented is, if necessary, subjected to post-treatment such as a boric-acid treatment in accordance with a known method. Such post-treatment is applied in order to improve light transmittance and degree of polarization of the polarizing film. The condition of the boric-acid treatment varies depending upon the type of polymer film to be used and the type of dye to be used; however, the boric-acid treatment is generally performed by soaking the polymer film in an aqueous solution of boric acid having a boric acid concentration ranging from 0.1 to 15 mass % and preferably 1 to 10 mass %, at a temperature ranging from 30 to 80° C. and preferably 40 to 75° C., for 0.5 to 10 minutes. In addition, if necessary, a fix treatment is further applied with an aqueous solution containing a cationic polymer compound.

To one or both surfaces of the dye polarizing film of the present invention obtained in this manner, a transparent protecting film excellent in optical transparency and mechanical strength is attached to obtain a polarizing plate. As the material for forming a protecting film, for example, a cellulose acetate film, an acrylic film, a fluorine film such as a tetrafluoroethylene-hexafluoropropylene copolymer film or a film formed of a polyester resin, a polyolefin resin or a polyamide resin is used. Preferably a triacetyl cellulose (TAC) film and a cycloolefin film are used. The thickness of the protecting film is usually 40 to 200 μm.

As an adhesive for bonding a polarizing film and a protecting film, a polyvinyl alcohol adhesive, a urethane emulsion adhesive, an acrylic adhesive or a polyester-isocyanate adhesive is mentioned, and a polyvinyl alcohol adhesive is preferable.

To a surface of the dye polarizing plate of the present invention, a transparent protecting layer may be further provided. As the protecting layer, for example, an acrylic or polysiloxane hard coat layer and a urethane protecting layer are mentioned. In order to further improve single-plate light transmittance, it is preferable to provide an AR layer onto the protecting layer. The AR layer can be formed, for example, by applying a substance such as silicon dioxide or titanium oxide by a vapor deposition or sputtering treatment or by thinly applying a fluorine substance. Note that, the dye polarizing plate of the present invention can be used as an elliptical polarizing plate by attaching a retardation film thereto.

The dye polarizing plate of the present invention thus constituted has a neutral color, no color leakage in the orthogonal arrangement within the visible light wavelength region and excellent polarization performance. In addition, the dye polarizing plate is characterized by causing neither discoloration nor reduction in polarization performance even in a high temperature and high humidity condition, and rarely causing light leakage in the visible light region in the orthogonal arrangement.

The in-car neutral gray polarizing plate of the present invention contains an azo compound represented by the above formula (1) or a salt thereof as a dichroic molecule together with optional organic dye(s) as mentioned above. Furthermore, the polarizing film to be used in the color polarizing plate for a liquid-crystal projector of the present invention is also produced by the method set forth in the section describing a method of producing the dye polarizing film of the present invention and used as a polarizing plate by further providing a protecting film thereto. Alternatively, if an optional protecting layer or AR (antireflection) layer, and a support or the like are provided, the polarizing film is used as an in-car neutral gray polarizing plate.

In a color polarizing plate for a liquid-crystal projector, a single-plate average light transmittance is 39% or more; an average light transmittance in the orthogonal arrangement is 0.4% or less in the requisite wavelength region of the polarizing plate (A. in the case where a super high-pressure mercury lamp is used; 420 to 500 nm for a blue channel, 500 to 580 nm for a green channel, 600 to 680 nm for a red channel; B. the peak wavelength: in the case where the three primary-color LED lamp is used; 430 to 450 nm for a blue channel, 520 to 535 nm for a green channel, 620 to 635 nm for a red channel); more preferably, the single-plate average light transmittance in the requisite wavelength region of the polarizing plate is 41% or more and the average light transmittance in the orthogonal arrangement is 0.3% or less and more preferably 0.2% or less; and further preferably, the single-plate average light transmittance in the requisite wavelength region of the polarizing plate is 42% or more and the average light transmittance in the orthogonal arrangement is 0.1% or less. The liquid-crystal projector color polarizing plate of the present invention has brightness and excellent polarization performance as described above.

Note that, the single-plate average light transmittance is an average value of light transmittance in a specific wavelength region when natural light is incident on a polarizing plate alone (hereinafter, a single term of "polarizing plate" will be used in the same sense) having neither an AR layer nor a support such as a transparent glass plate. The average light transmittance in the orthogonal arrangement is an average value of light transmittance in a specific wavelength region when natural light is incident on two polarizing plates stacked such that the orientation directions intersect at right angles.

The in-car neutral gray polarizing plate of the present invention is preferably a polarizing plate attached with an AR layer, which is obtained by attaching the AR layer to a polarizing plate constituted of a polarizing film and a protecting film, and further preferably, a polarizing plate attached with an AR layer and a support, which is obtained by providing an AR layer attached to a support (e.g., a transparent resin).

The in-car neutral gray polarizing plate of the present invention is usually used as a polarizing plate attached with a support. The support preferably has a planar section for attaching the polarizing plate. In addition, because of optical application, a transparent substrate is preferable. As transparent substrates, inorganic substrates and organic substrates are roughly mentioned, and more specifically, inorganic substrates such as a soda glass, a borosilicate glass, a quartz substrate, a sapphire substrate and a spinel substrate; and organic substrates made of an acrylic, a polycarbonate, a polyethylene terephthalate, a polyethylene naphthalate, and a cycloolefin polymer are mentioned; however, an organic substrate is preferable. The thickness and size of the transparent substrate may be appropriately determined as the user desires. In order to further improve a single plate light transmittance an AR layer is preferably provided to either one or both of the support (substrate) surface or the polarizing plate surface of the transparent substrate-attached polarizing plate.

An in-car support-attached color polarizing plate is produced, for example, by applying a transparent adhesive (pressure-sensitive adhesive) agent to the flat portion of the support and bonding the dye polarizing plate of the present invention to the adhesive surface. Furthermore, a transparent adhesive (pressure-sensitive adhesive) agent is applied to a polarizing plate and subsequently, the support may be attached to the adhesive surface. As the adhesive (pressure-sensitive adhesive) agent to be used herein, for example, an acrylic ester adhesive agent is preferable. Note that, when the polarizing plate is used as an elliptical polarizing plate, usually a retardation film is attached so as to face the support; however, the polarizing plate may be attached so as to face a transparent substrate (support).

In short, in the in-car liquid crystal display employing the dye polarizing plate of the present invention, the dye polarizing plate of the present invention is arranged on either one or both of the incident side and emission side of a liquid crystal cell. The polarizing plate may be in contact or not in contact with the liquid crystal cell; however, the polarizing plate is preferably not in contact with the liquid crystal cell in view of durability. When a polarizing plate is in contact with the emission side of a liquid crystal cell, the dye polarizing plate of the present invention in which the liquid crystal cell is a support can be used. When a polarizing plate is not in contact with a liquid crystal cell, it is preferable to use the dye polarizing plate of the present invention employing a support other than the liquid crystal cell. Furthermore, in view of durability, the dye polarizing plate of the present invention is preferably disposed on both of the incident side and emission side of the liquid crystal cell, and further preferably, the polarizing plate surface of the dye polarizing plate of the present invention is disposed so as to face the liquid crystal cell and the support surface is disposed so as to face the light source. Note that, the incident side of a liquid crystal cell refers to a side close to a light source and the opposite side refers to the emission side.

In an in-car liquid crystal display using the dye polarizing plate of the present invention, the liquid crystal cell to be used is, for example, an active matrix type, which is preferably formed by enclosing a liquid crystal between a transparent substrate on which an electrode and a TFT are formed and a transparent substrate on which an opposite electrode is formed. Light emitted from a light source such as a cold-cathode tube lamp or a white LED passes through a neutral gray polarizing plate, subsequently a liquid crystal cell, a color filter, and further a neutral gray polarizing plate, and projected on a display screen.

The in-car neutral gray polarizing plate thus constituted is excellent in polarization performance and characterized by causing no discoloration and reduction in polarization performance even in high temperature and high humidity condition in cars.

EXAMPLES

Now, the present invention will be more specifically described by way of Examples, which are illustrative and should not be construed as particularly limiting the present invention. The terms "%" and "parts" in Examples are described on a mass basis unless otherwise specified.

Example 1

First, 39.8 parts of 6-(4-aminobenzoylamino)-4-hydroxynaphthalene-2-sulfonic acid was added to 400 parts of water. Then, 11.3 parts of anhydrous acetic acid was added. The reaction solution was stirred at 30 to 50° C. for 3 hours. To this, 12.7 parts of propane sultone was further added and the mixture was allowed to react at 70 to 90° C. for 4 hours while maintaining pH7 to 10 with sodium carbonate. To the resultant reaction solution, 15.6 parts of 35% hydrochloric acid was added and stirred at 40 to 80° C. for 2 hours. After cooled to 10 to 20° C., the reaction solution was filtered to obtain 48.1 parts of the aminobenzoylamino-sulfopropoxy naphthalene sulfonic acid represented by the following formula (80).

[Formula 94]

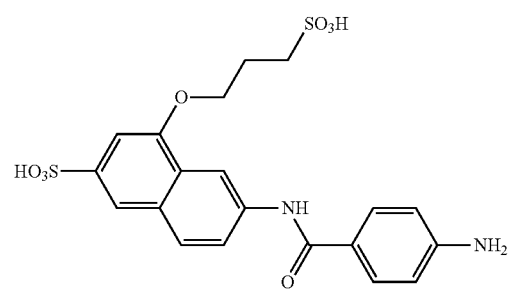

(80)

First, 48.1 parts of 6-(4-aminobenzoylamino)-4-(3-sulfopropoxy)naphthalene-2-sulfonic acid was added to 500 parts of water and then, the reaction solution was cooled. Then, 31.3 parts of 35% hydrochloric acid was added at 10° C. or less and subsequently 6.9 parts of sodium nitrite was added. The reaction solution was stirred at 5 to 10° C. for one hour to perform diazotization. To the resultant reaction solution, 12.1 parts of 3-methylaniline dissolved in a diluted hydrochloric acid solution was added and sodium carbonate was added while stirring at 10 to 30° C. to adjust pH to 3. The reaction solution was further stirred to complete the coupling reaction and filtered to obtain 49.0 parts of the monoazoamino compound represented by the following formula (81).

[Formula 95]

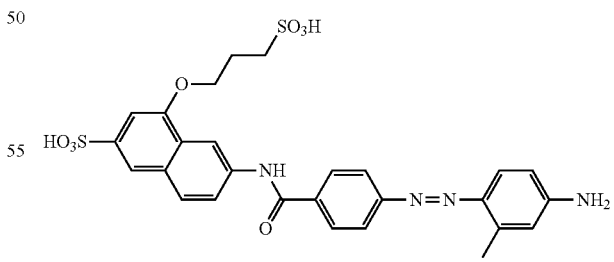

(81)

The resultant monoazoamino compound (49.0 parts) was added to 400 parts of water and dissolved with the help of sodium hydroxide. To this, 25.0 parts of 35% hydrochloric acid was added at 10 to 30° C. and subsequently 5.5 parts of sodium nitrite was added. The reaction solution was stirred at 20 to 30° C. for one hour to perform diazotization. Separately, 28.7 parts of 7-(4-aminobenzoylamino)-4-hydroxynaphthalene-2-sulfonic acid was added to 50 parts of water and dissolved by adjusting the solution into a weak alkaline solution with sodium carbonate. To this solution, the diazotized compound of a trisazoamino compound previously obtained was poured while maintaining pH8 to 10. The reaction solution was stirred to complete the coupling reaction. Salting-out with sodium chloride and filtration were performed to obtain 38.7 parts of the disazo compound represented by the above formula (8). The maximum absorption wavelength of the compound in a 20% aqueous pyridine solution was 516 nm.

Example 2

The same procedure as in the first step of Example 1 was repeated except that 39.8 parts of 6-(4-aminobenzoylamino)-4-hydroxynaphthalene-2-sulfonic acid was changed to 39.8 parts of 7-(4-aminobenzoylamino)-4-hydroxynaphthalene-2-sulfonic acid to obtain the aminobenzoylaminosulfopropoxy naphthalene sulfonic acid (48.1 parts) represented by the following formula (82).

[Formula 96]

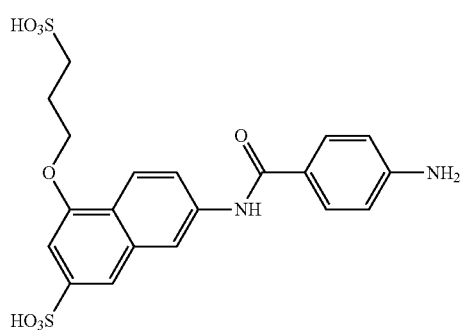

(82)

The same procedure as in the second step of Example 1 was repeated except that 48.1 parts of 6-(4-aminobenzoylamino)-4-(3-sulfopropoxy)naphthalene-2-sulfonic acid was changed to 48.1 parts of 7-(4-aminobenzoylamino)-4-(3-sulfopropoxy)naphthalene-2-sulfonic acid and 12.1 parts of 3-methylaniline was changed to 12.1 parts of 2,5-dimethylaniline to obtain the monoazoamino compound (49.0 parts) represented by the following formula (83).

[Formula 97]

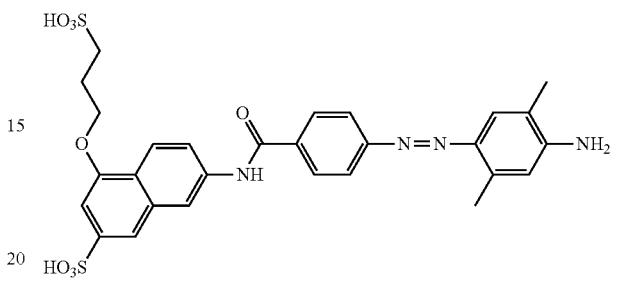

(83)

The resultant monoazoamino compound (49.0 parts) was added to 400 parts of water and dissolved with the help of sodium hydroxide. To this, 25.0 parts of 35% hydrochloric acid was added at 10 to 30° C. and subsequently 5.5 parts of sodium nitrite was added. The reaction solution was stirred at 20 to 30° C. for one hour to perform diazotization. To the resultant reaction solution, 9.7 parts of 2,5-dimethylaniline dissolved in a diluted aqueous hydrochloric acid solution was added and sodium carbonate was added while stirring at 20 to 30° C. to adjust pH to 3. The reaction solution was further stirred to complete the coupling reaction and filtered to obtain 41.7 parts of the disazoamino compound represented by the following formula (84).

[Formula 98]

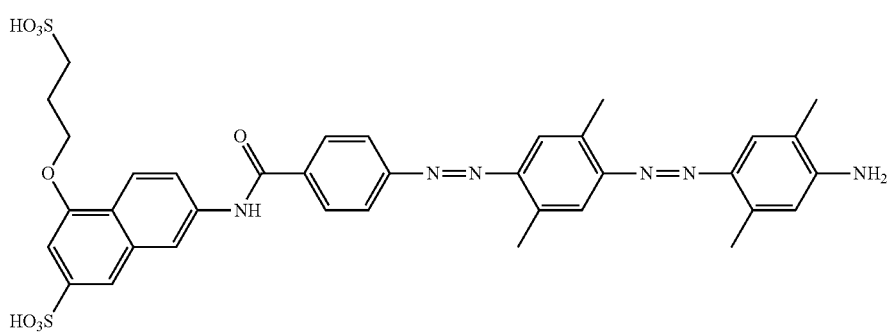

(84)

The resultant disazoamino compound (41.7 parts) was added to 250 parts of water and dissolved with the help of sodium hydroxide. To this, 17.5 parts of 35% hydrochloric acid was added at 20 to 30° C. and subsequently 3.9 parts of sodium nitrite was added. The reaction solution was stirred at 20 to 30° C. for one hour to perform diazotization. Separately, 17.7 parts of 7-phenylamino-4-hydroxynaphthalene-2-sulfonic acid was added to 50 parts of water and dissolved by adjusting the solution into a weak alkaline solution with sodium carbonate. To this solution, the diazotized compound of a trisazoamino compound previously obtained was poured while maintaining pH8 to 10. The reaction solution was stirred to complete the coupling reaction. Salting-out with sodium chloride and filtration were performed to obtain 30.0 parts of the trisazo compound represented by the above formula (32). The maximum absorption wavelength of the compound in a 20% aqueous pyridine solution was 564 nm.

Example 3

The trisazo compound (32.7 parts) represented by the above formula (33) was obtained in the same procedure as in Example 2 except that a tertiary coupler of Example 2 was changed from 17.7 parts of 7-phenylamino-4-hydroxynaphthalene-2-sulfonic acid to 23.0 parts of 7-(4-amino-3-sulfophenylamino)-4-hydroxynaphthalene-2-sulfonic acid. The maximum absorption wavelength of the compound in a 20% aqueous pyridine solution was 575 nm.

Example 4

The same procedure as in the first step of Example 2 was repeated except that the starting material of the first step of Example 2 was changed from 7-(4-aminobenzoylamino)-4-hydroxynaphthalene-2-sulfonic acid to 6-(4-aminobenzoylamino)-4-hydroxynaphthalene-2-sulfonic acid to obtain 48.1 parts of 6-(4-aminobenzoylamino)-4-(3-sulfopropoxy) naphthalene-2-sulfonic acid.
The same procedure of Example 2 was repeated except that, on and after the second step, 48.1 parts of the aminobenzoylamino-sulfopropoxy naphthalene sulfonic acid represented by the above formula (82) was changed to 48.1 parts of 6-(4-aminobenzoylamino)-4-(3-sulfopropoxy)naphthalene-2-sulfonic acid; a primary coupler was changed from 12.1 parts of 2,5-dimethylaniline to 10.7 parts of 3-methylaniline; a secondary coupler was changed from 9.7 parts of 2,5-methylaniline to 6.0 parts of 3-methylaniline; and a tertiary coupler was changed from 17.7 parts of 7-phenylamino-4-hydroxynaphthalene-2-sulfonic acid to 20.1 parts of 7-(4-aminobenzoylamino)-4-hydroxynaphthalene-2-sulfonic acid to obtain 30.4 parts of the trisazo compound represented by the above formula (34). The maximum absorption wavelength of the compound in a 20% aqueous pyridine solution was 528 nm.

Example 5

The same procedure as in the first step of Example 2 was repeated to obtain 48.1 parts of the aminobenzoylaminosulfopropoxy naphthalene sulfonic acid represented by the above formula (82).

The same procedure as in the second step of Example 2 was repeated except that 12.1 parts of 2,5-dimethylaniline was changed to 24.5 parts of 2-sulfopropoxy-5-methylaniline to obtain 58.9 parts of the monoazoamino compound represented by the following formula (85).

[Formula 99]

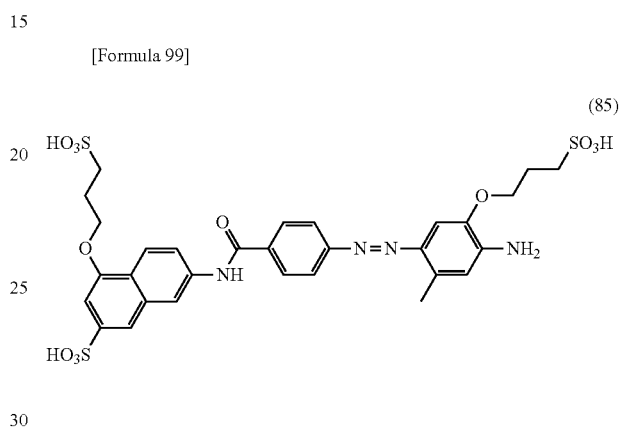

(85)

The same procedure as in the third step of Example 2 was repeated except that 49.0 parts of the monoazoamino compound represented by the above formula (83) was changed to 58.9 parts of the monoazoamino compound represented by the above formula (85) to obtain 48.6 parts of the disazoamino compound represented by the following formula (86).

[Formula 100]

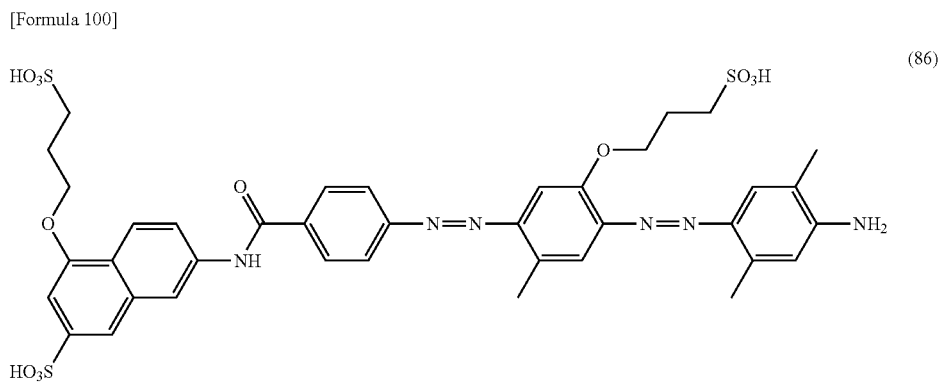

(86)

The resultant disazoamino compound (48.6 parts) was added to 250 parts of water and dissolved with the help of sodium hydroxide. To this, 17.5 parts of 35% hydrochloric acid was added at 20 to 30° C. and subsequently 3.9 parts of sodium nitrite was added. The reaction solution was stirred at 20 to 30° C. for one hour to perform diazotization. To the resultant reaction solution, 6.8 parts of 2,5-dimethylaniline dissolved in a diluted hydrochloric acid solution was added and sodium carbonate was added while stirring at 20 to 30° C. to adjust pH to 3.5. The reaction solution was further stirred to complete the coupling reaction and filtered to obtain 33.6 parts of the trisazoamino compound represented by the following formula (87).

[Formula 101]

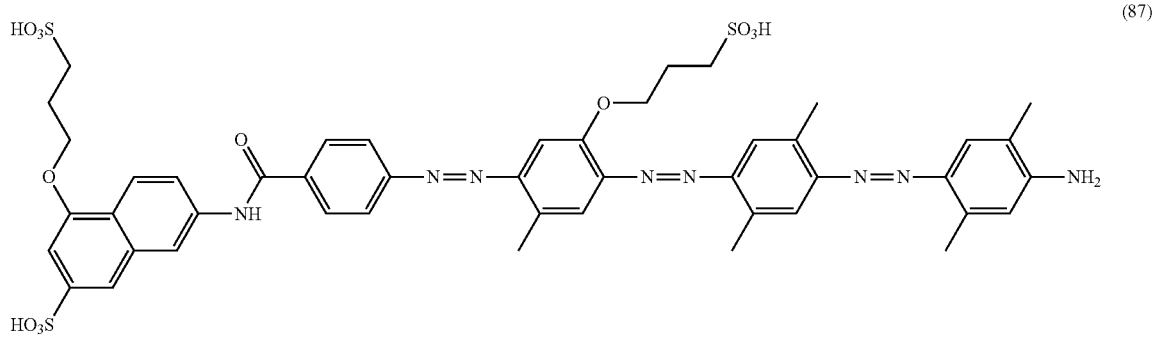

(87)

The resultant trisazoamino compound (33.6 parts) was added to 200 parts of water and dissolved with the help of sodium hydroxide. Then, 10.5 parts of a 35% hydrochloric acid was added at 20 to 30° C. and subsequently 2.3 parts of sodium nitrite was added. The reaction solution was stirred at 20 to 30° C. for one hour to perform diazotization. Separately, 10.6 parts of 7-phenylamino-4-hydroxynaphthalene-2-sulfonic acid was added to 50 parts of water and dissolved by adjusting the solution into a weak alkaline solution with sodium carbonate. To this solution, the diazotized compound of a trisazoamino compound previously obtained was poured while maintaining pH8 to 10. The reaction solution was stirred to complete the coupling reaction. Salting-out with sodium chloride and filtration were performed to obtain 22.3 parts of the tetrakisazo compound represented by the above formula (56). The maximum absorption wavelength of the compound in a 20% aqueous pyridine solution was 575 nm.

Example 6

In an aqueous solution of 45° C. containing the compound represented by the above formula (8) obtained in Example 1 in a concentration of 0.03% and salt cake in a concentration of 0.1%, a polyvinyl alcohol film of 75 µm in thickness was soaked for 4 minutes. The film was stretched to 5 fold in a 3% aqueous solution of boric acid at 50° C., washed with water and dried while maintaining a state of tension to obtain a polarizing film.

The maximum absorption wavelength of the resultant polarizing film was 531 nm and the polarization rate thereof was as high as 99.9%.

Note that, a test method will be described below.

Measurement of the maximum absorption wavelength of a polarizing film and calculation of the polarization rate thereof were made based on parallel transmittance and orthogonal transmittance at the time of incident of polarized light measured by a spectrophotometer (U-4100, manufactured by Hitachi, Ltd.).

The parallel transmittance (Ky) herein refers to the transmittance when the absorption axis of an absolute polarizer is disposed in parallel to the absorption axis of a polarizing film; whereas the orthogonal transmittance (Kz) refers to the transmittance when the absorption axis of an absolute polarizer is disposed in perpendicular to the absorption axis of a polarizing film.

The parallel transmittance and orthogonal transmittance were measured at intervals of 1 nm within the wavelength range of 380 to 780 nm. The polarization rates of individual wavelengths were calculated based on the measured values in accordance with the following Expression (i). The highest polarization rate within the range of 380 to 780 nm and the maximum absorption wavelength (nm) thereof were obtained.

[Expression 1]

$$\text{polarization rate (\%)} = [(Ky-Kz)/[(Ky+Kz)] \times 100 \qquad (i)$$

Examples 7, 8, 9 and 10

Polarizing films were obtained in the same manner as in Example 6 except that azo compounds of Example 2, 3, 4 and 5 were used in place of the compound of the above formula (8). The maximum absorption wavelengths and polarization rates of the obtained polarizing films are shown in Table 1. As shown in Table 1, polarizing films prepared from these compounds all had high polarization rates.

TABLE 1

| Example | Azo compound or salt thereof | Maximum absorption wavelength (nm) | Polarization rate (%) |
|---|---|---|---|
| 6 | Compound of formula (8) | 531 | 99.9 |
| 7 | Compound of formula (32) | 579 | 99.9 |
| 8 | Compound of formula (33) | 590 | 99.9 |
| 9 | Compound of formula (34) | 543 | 99.9 |
| 10 | Compound of formula (56) | 591 | 99.9 |

Example 11

As an index for image quality, contrast which indicates difference in luminance between white display and black display is used. The average contrast of the polarizing film obtained in Example 6 (from the compound of Example 1 used as a raw material) within the range of 510 nm to 560 nm is shown in Table 2. The average contrast within the range of 510 nm to 560 nm herein is obtained as follows. First, the parallel transmittance and orthogonal transmittance at individual wavelengths within the range of 510 nm to 560 nm are measured and an average parallel transmittance and an average orthogonal transmittance were separately calculated. The average parallel transmittance is obtained in accordance with the expression:

Average parallel transmittance in 510 nm to 560 nm (Ave.$_{510-560\ nm}$ Ky)=the sum of Ky of individual wavelengths in 510 nm to 560 nm/number of measuring points.

The average orthogonal transmittance is obtained in accordance with the expression:

Average orthogonal transmittance in 510 nm to 560 nm (Ave.$_{510-560\ nm}$ Kz)=the sum of Kz of individual wavelengths in 510 nm to 560 nm/number of measuring points.

Then, the ratio of the average parallel transmittance to the average orthogonal transmittance, was obtained in accordance with the expression:

Average contrast in 510 nm to 560 nm=Average parallel transmittance in 510 nm to 560 nm (Ave.$_{510-560\ nm}$ Ky)/Average orthogonal transmittance in 510 nm to 560 nm (Ave.$_{510-560\ nm}$ KZ).

The larger value of the ratio means that the polarization performance of the polarizing plate in the range of 510 nm to 560 nm is excellent; in other words, means that the polarization performance of a neutral gray polarizing plate within a predetermined wavelength range is excellent. As shown in Table 1, the polarizing film prepared from the compound of Example 1 had a high contrast.

Comparative Example 1

A polarizing film was prepared in the same manner as in Example 6 of the present invention from a compound (4) synthesized in the same manner as in Example 2 of Patent Literature 4 in place of the compound of Example 1, and the average contrast thereof in the range of 510 nm to 560 nm was calculated in the same manner as in Example 11.

As shown in Table 1, in the case of the compound of the present invention, high contrast is shown compared to that of Comparative Example 1 and polarization performance was excellent.

Comparative Example 2

A polarizing film was prepared in the same manner as in Example 6 of the present invention from a compound (1-3) synthesized in the same manner as described in paragraph [0077] of Patent Literature 5 in place of the compound of Example 1, and the average contrast thereof in the range of 510 nm to 560 nm was calculated in the same manner as in Example 11.

As shown in Table 1, in the case of the compound of the present invention, high contrast was shown compared to that of Comparative Example 2 and polarization performance was excellent.

TABLE 2

| Azo compound or a salt thereof | Average contrast in 510 nm to 560 nm |
|---|---|
| Example 11 (Example 1: compound of formula (8)) | 189 |
| Comparative Example 1 (compound (4) of Patent Literature 4) | 2.92 |
| Comparative Example 2 (compound (I-3) of Patent Literature 5) | 40.9 |

Examples 12 and 13

In the same manner as in Example 11, the average contrast (Example 12) of the polarizing film obtained from the compound of Example 2 used as a raw material in Example 7 within the range of 560 nm to 600 nm was calculated, and the average contrast (Example 13) of the polarizing film obtained from the compound of Example 3 used as a raw material in Example 8 within the range of 560 nm to 600 nm was calculated. The results are shown in Table 3.

Comparative Example 3

A polarizing film was prepared in the same manner as in Example 6 of the present invention from a compound (4) synthesized in the same manner as in Example 2 of Patent Literature 4 in place of the compound of Example 2 and the average contrast thereof in the range of 560 nm to 600 nm was calculated in the same manner as in Examples 12 and 13. As shown in Table 3, in either one of the compound of the present invention, high contrast was shown compared to that of Comparative Example 3 and polarization performance was excellent.

Comparative Example 4

A polarizing film was obtained in the same manner as in Example 6 of the present invention from a compound (1-3) synthesized in the same manner as described in paragraph [0077] of Patent Literature 5 in place of the compound of Example 2 and the average contrast thereof in the range of 560 nm to 600 nm was calculated in the same manner as in Examples 12 and 13.

As shown in Table 3, for all the compounds of the present invention, high contrast was shown compared to that of Comparative Example 4 and polarization performance was excellent.

TABLE 3

| Azo compound or a salt thereof | Average contrast in 560 nm to 600 nm |
|---|---|
| Example 12 (Example 7: compound of formula (32)) | 140 |
| Example 13 (Example 8: compound of formula (33)) | 124 |
| Comparative Example 3 (compound (4) of Patent Literature 4) | 3.91 |
| Comparative Example 4 (compound (I-3) of Patent Literature 5) | 58.7 |

Example 14

In the same manner as in Examples 11, the average contrast of the polarizing film obtained from the compound of Example 5 used as a raw material in Example 10 within the range of 550 nm to 600 nm was calculated. The results is shown in Table 2.

Comparative Example 5

A polarizing film was prepared in the same manner as in Example 10 of the present invention from a compound (4) synthesized in the same manner as in Example 2 of Patent Literature 4 in place of the compound of Example 5 and the average contrast thereof in the range of 550 nm to 600 nm was calculated in the same manner as in Example 14.

As shown in Table 4, in the case of the compound of the present invention, high contrast was shown compared to that of Comparative Example 5 and polarization performance was excellent.

Comparative Example 6

A polarizing film was prepared in the same manner as in Example 10 of the present invention from a compound (1-3) synthesized in the same manner as described in paragraph [0077] of Patent Literature 5 in place of the compound of Example 5 and the average contrast thereof in the range of 550 nm to 600 nm was calculated in the same manner as in Example 14.

As shown in Table 4, in the case of the compound of the present invention, high contrast was shown compared to that of Comparative Example 6 and polarization performance was excellent.

TABLE 4

| Azo compound or a salt thereof | Average contrast in 550 nm to 600 nm |
|---|---|
| Example 14 (Example 5: compound of formula (56)) | 189 |
| Comparative Example 5 (compound (4) of Patent Literature 4) | 6.69 |
| Comparative Example 6 (compound (I-3) of Patent Literature 5) | 53.0 |

Example 15

A polarizing film was prepared in the same manner as in Example 6 except that the aqueous solution of 45° C., which contained the compound represented by the above formula (8) obtained in Example 1 in a concentration of 0.03% and salt cake in a concentration of 0.1%, was changed to an aqueous solution of 45° C., which contained the compound represented by the above formula (8) obtained in Example 1 in a concentration of 0.2%, 0.07% of C. I. Direct Orange 39, 0.02% of C. I. Direct Blue 67 and salt cake in a concentration of 0.1%. The maximum absorption wavelength of the resultant polarizing film was 555 nm; the single plate average transmittance in the range of 380 to 600 nm was 42%; and the average light transmittance of the orthogonal arrangement was 0.02%. The degree of polarization was high.

On the both surfaces of the polarizing film, a triacetyl cellulose film (TAC the film; trade name: TD-80U, manufactured by Fuji Photo Film Co., Ltd.) was laminated with an adhesive, i.e., an aqueous polyvinyl alcohol solution, interposed between them and an AR support was attached by use of a pressure-sensitive adhesive to obtain the dye polarizing plate of the present invention (neutral gray polarizing plate) with an AR support. The polarizing plate of this Example had a high polarization rate and durability for long period of time even in a high-temperature and high-humidity condition. In addition, light resistance was excellent when the polarizing plate was exposed for long period of time.

Example 16

A polarizing film was prepared in the same manner as in Example 6 except that the aqueous solution of 45° C., which contained the compound represented by the above formula (8) obtained in Example 1 in a concentration of 0.03% and salt cake in a concentration of 0.1%, was changed to an aqueous solution of 45° C., which contained the compound represented by the above formula (32) obtained in Example 2 in a concentration of 0.2%, 0.07% of C. I. Direct Orange 39, 0.02% of C. I. Direct Red 81 and salt cake in a concentration of 0.1%. The maximum absorption wavelength of the resultant polarizing film was 555 nm; the single plate average transmittance in the range of 380 to 600 nm was 42%; and the average light transmittance of the orthogonal arrangement was 0.02%. The degree of polarization was high.

On the both surfaces of the polarizing film, a triacetyl cellulose film (TAC the film; trade name: TD-80U, manufactured by Fuji Photo Film Co., Ltd.) was laminated with an adhesive of an aqueous polyvinyl alcohol solution interposed between them and an AR support was attached by use of a pressure-sensitive adhesive to obtain the dye polarizing plate of the present invention (neutral gray polarizing plate) with an AR support. The polarizing plate of this Example had a high polarization rate and durability for long period of time even in a high-temperature and high-humidity condition. In addition, light resistance was excellent when the polarizing plate was exposed for long period of time.

Example 17

A polarizing film was prepared in the same manner as in Example 6 except that the aqueous solution of 45° C., which contained the compound represented by the above formula (8) obtained in Example 1 in a concentration of 0.03% and salt cake in a concentration of 0.1%, was changed to an aqueous solution of 45° C., which contained the compound represented by the above formula (56) obtained in Example 5 in a concentration of 0.2%, 0.07% of C. I. Direct Orange 39, 0.02% of C. I. Direct Red 81 and salt cake in a concentration of 0.1%. The maximum absorption wavelength of the resultant polarizing film was 555 nm; the single plate average transmittance in the range of 380 to 600 nm was 42%; and the average light transmittance of the orthogonal arrangement was 0.02%. The degree of polarization was high.

On the both surfaces of the polarizing film, a triacetyl cellulose film (TAC the film; trade name: TD-80U, manufactured by Fuji Photo Film Co., Ltd.) was laminated with an adhesive of an aqueous polyvinyl alcohol solution interposed between them and an AR support was attached by use of a pressure-sensitive adhesive to obtain the dye polarizing plate of the present invention (neutral gray polarizing plate) with an AR support. The polarizing plate of this Example had a high polarization rate and durability for long period of time even in a high-temperature and high-humidity condition. In addition, light resistance was excellent when the polarizing plate was exposed for long period of time.

The invention claimed is:

1. A dye polarizing film containing a polarizing-film base containing an azo compound or a salt thereof, represented by the following formula (6):

[Formula 6]

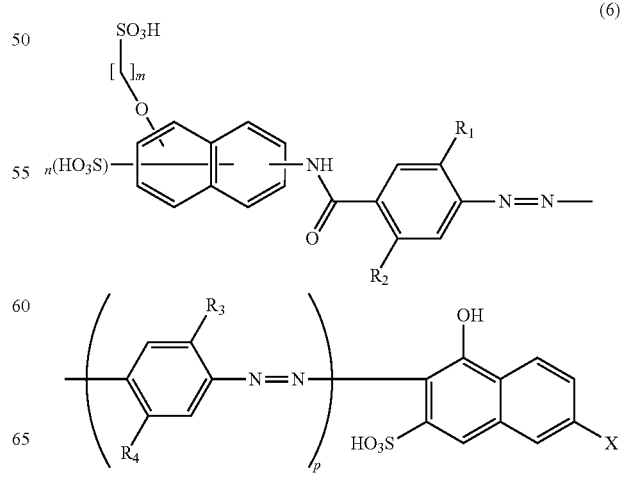

wherein $R_1$ to $R_4$ each independently represent a hydrogen atom, an alkyl group having 1 to 5 carbon atoms, an alkoxy group having 1 to 5 carbon atoms, a sulfo group or an alkoxy group having 1 to 5 carbon atoms and a sulfo group; X represents an amino group having a substituent, a phenylamino group having a substituent, a benzoylamino group having a substituent, a naphthotriazole group having a substituent or a phenylazo group having a substituent; m represents 3 or 4; n represents 1 or 2; and p represents 1, 2 or 3;

wherein the phenylamino group is represented by the following formula (2):

[Formula 2]

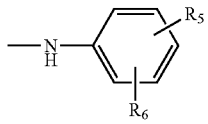

(2)

wherein $R_5$ and $R_6$ each independently represent a hydrogen atom, a methyl group, a methoxy group, a sulfo group, an amino group or a substituted amino group; or a salt thereof;

wherein the benzoylamino group is represented by the following formula (3):

[Formula 3]

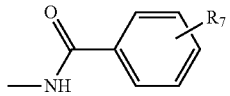

(3)

wherein $R_7$ represents a hydrogen atom, a hydroxy group, an amino group or a substituted amino group; or a salt thereof;

wherein the naphthotriazole group is represented by the following formula (4):

[Formula 4]

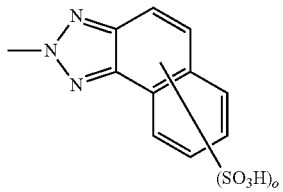

(4)

wherein o represents 1 or 2; or a salt thereof;

wherein the phenylazo group is represented by the following formula (5):

[Formula 5]

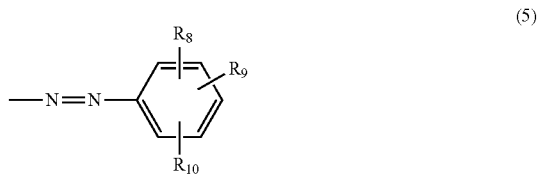

(5)

wherein $R_8$ to $R_{10}$ each independently represent a hydrogen atom, a hydroxy group, an alkyl group having 1 to 5 carbon atoms, an alkoxy group having 1 to 5 carbon atoms, an amino group or a substituted amino group; or a salt thereof.

2. The dye polarizing film azo compound according to claim 1, wherein $R_1$ and $R_2$ are hydrogen atoms; or a salt thereof.

3. The dye polarizing film according to claim 1, wherein $R_3$ and $R_4$ each independently represent a hydrogen atom, a methyl group, a methoxy group or an alkoxy group having 1 to 5 carbon atoms and a sulfo group; or a salt thereof.

4. The dye polarizing film according to claim 1 containing the azo compound or a salt thereof, and at least one other organic dye.

5. The dye polarizing film according to claim 1 containing at least two of the azo compounds or salts thereof, and at least one other organic dye.

6. The dye polarizing film according to claim 1, wherein the polarizing-film base is a film formed of a polyvinyl alcohol resin or a derivative thereof.

7. A dye polarizing plate obtained by attaching a transparent protecting layer onto at least one surface of the dye polarizing film according to claim 1.

8. A dye polarizing plate for a liquid crystal display comprising the dye polarizing film according to claim 1.

9. An in-car neutral gray dye polarizing plate comprising the dye polarizing film according to claim 1.

10. A liquid crystal display device comprising using the dye polarizing plate according to any one of claims 7 to 9.

* * * * *